(12) United States Patent
Zhou et al.

(10) Patent No.: US 12,634,557 B2
(45) Date of Patent: *May 19, 2026

(54) METHOD, APPARATUS AND ELECTRONIC DEVICE FOR PROCESSING OF VIDEO RECOMMENDATIONS

(71) Applicant: Beijing Bytedance Network Technology Co., Ltd., Beijing (CN)

(72) Inventors: Jingran Zhou, Beijing (CN); Yue Chen, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/894,526

(22) Filed: Sep. 24, 2024

(65) Prior Publication Data

US 2025/0016414 A1    Jan. 9, 2025

Related U.S. Application Data

(63) Continuation of application No. 18/592,058, filed on Feb. 29, 2024, which is a continuation of application (Continued)

(30) Foreign Application Priority Data

Nov. 18, 2021    (CN) .......................... 202111370575.9

(51) Int. Cl.
*H04N 21/466* (2011.01)
*H04N 21/442* (2011.01)
(Continued)

(52) U.S. Cl.
CPC ... *H04N 21/4668* (2013.01); *H04N 21/44226* (2020.08); *H04N 21/47217* (2013.01); *H04N 21/4788* (2013.01)

(58) Field of Classification Search
CPC ......... H04N 21/4788; H04N 21/25891; H04N 21/44226; H04N 21/4312; H04N 21/4668; H04N 21/4316
See application file for complete search history.

(56) References Cited

U.S. PATENT DOCUMENTS

| | | | |
|---|---|---|---|
| 10,319,049 B2 | 6/2019 | Trombetta et al. | |
| 11,936,954 B2 | 3/2024 | Zhou et al. | |

(Continued)

FOREIGN PATENT DOCUMENTS

| | | |
|---|---|---|
| CN | 103930920 | 7/2014 |
| CN | 104052765 | 9/2014 |

(Continued)

OTHER PUBLICATIONS

International Search Report and Written Opinion for International Application No. PCT/CN2022/129125, mailed Jan. 12, 2023, 12 Pages.

(Continued)

*Primary Examiner* — Jason Salce
(74) *Attorney, Agent, or Firm* — Fish & Richardson P.C.

(57) ABSTRACT

The present disclosure provides a method, apparatus, and electronic device for processing of video recommendations. The present disclosure enables: at least one of second users can recommend a video to a first user, and when recommending the video, the second user can add own recommendation comment on the video, and the first user sees the comment on the video from the at least one of second users on a playback interface of a first client, and can also conduct operations such as comment, like, etc. on the comment by the second user, and can further recommend the video to a third user.

20 Claims, 13 Drawing Sheets

Related U.S. Application Data

No. 17/724,945, filed on Apr. 20, 2022, now Pat. No. 11,936,954.

(51) Int. Cl.
*H04N 21/472* (2011.01)
*H04N 21/4788* (2011.01)

(56) References Cited

U.S. PATENT DOCUMENTS

| | | | |
|---|---|---|---|
| 2008/0276279 A1 | 11/2008 | Gossweiler et al. | |
| 2010/0043020 A1* | 2/2010 | Basso | H04N 21/6582 725/40 |
| 2010/0272420 A1* | 10/2010 | Soohoo | H04N 21/8455 386/E5.003 |
| 2012/0030586 A1* | 2/2012 | Ketkar | H04N 21/4532 715/751 |
| 2013/0124504 A1 | 5/2013 | Haugen et al. | |
| 2016/0021179 A1* | 1/2016 | James | G06Q 10/10 709/204 |
| 2016/0149967 A1* | 5/2016 | Lewis | H04L 51/046 715/753 |
| 2016/0301748 A1* | 10/2016 | Conley | H04L 67/1095 |
| 2017/0244774 A1 | 8/2017 | Trombetta et al. | |
| 2019/0179852 A1 | 6/2019 | Fei | |
| 2021/0234909 A1 | 7/2021 | Shortt | |
| 2021/0240792 A1 | 8/2021 | Feng et al. | |
| 2022/0394343 A1 | 12/2022 | Sun et al. | |
| 2023/0007333 A1* | 1/2023 | Bancs | H04N 21/2743 |
| 2023/0097683 A1* | 3/2023 | Liu | G06F 16/7867 386/241 |
| 2023/0156283 A1 | 5/2023 | Zhou et al. | |
| 2024/0205502 A1 | 6/2024 | Zhou et al. | |

FOREIGN PATENT DOCUMENTS

| | | |
|---|---|---|
| CN | 106533899 | 3/2017 |
| CN | 107122100 | 9/2017 |
| CN | 109640129 A | 4/2019 |
| CN | 110209952 A | 9/2019 |
| CN | 111526411 | 8/2020 |
| CN | 111641859 | 9/2020 |
| CN | 111670437 | 9/2020 |
| CN | 112698767 A | 4/2021 |
| CN | 110188232 | 9/2021 |
| EP | 3944566 | 1/2022 |
| JP | 2021150774 A | 9/2021 |

OTHER PUBLICATIONS

Extended European Search Report in European Appln No. 22894629.9, dated Jan. 14, 2025, 10 pages.

Office Action in Chinese Appln. No. 202111370575.9, dated Aug. 2, 2025, 18 pages (with machine translation).

Office Action in Japanese Appln. No. 2024-529843, dated Oct. 7, 2025, 10 pages (with English translation).

* cited by examiner

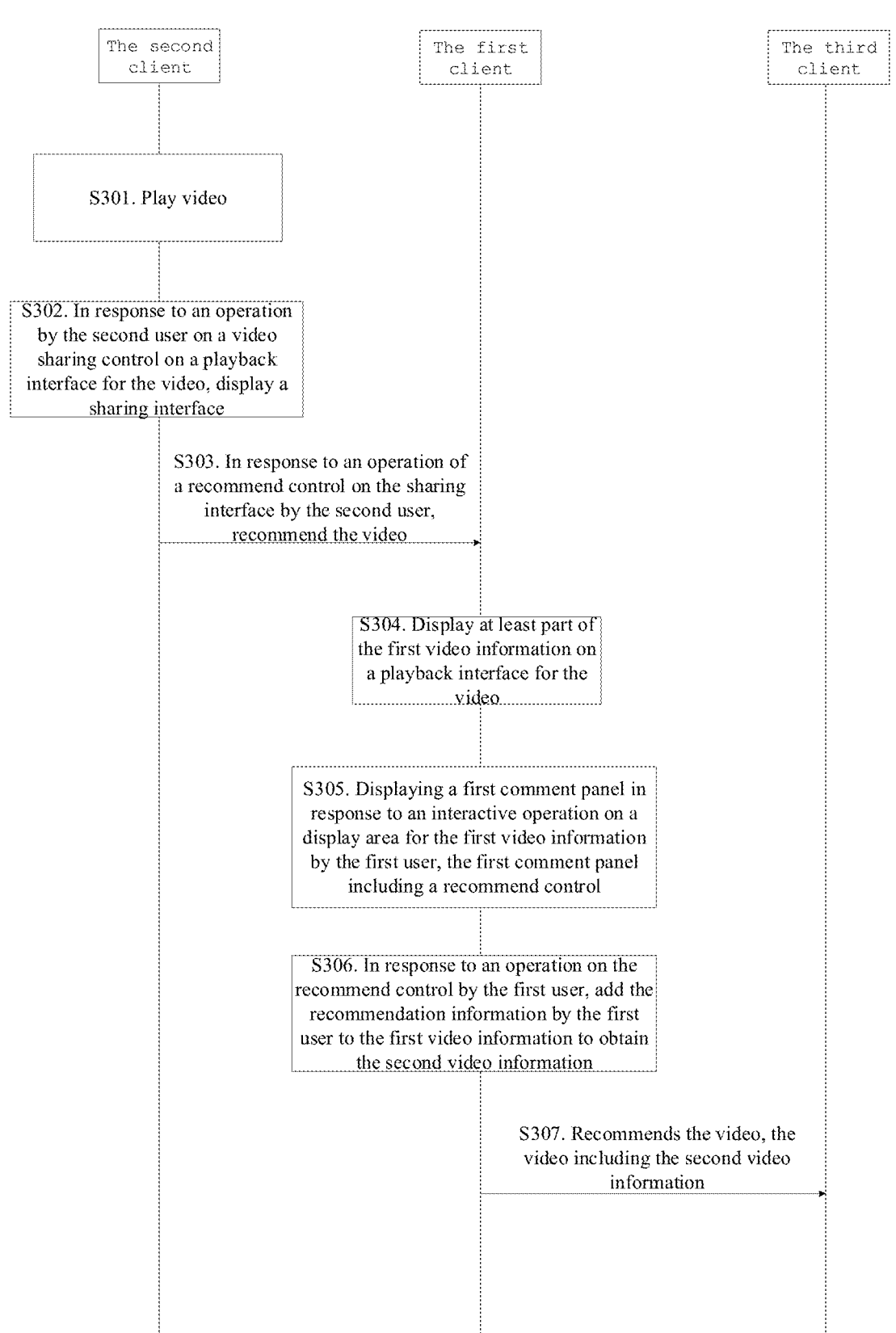

The second client

S301. Play video

S302. In response to an operation by the second user on a video sharing control on a playback interface for the video, display a sharing interface S303. In response to an operation of a recommend control on the sharing interface by the second user, recommend the video The first client S304. Display at least part of the first video information on a playback interface for the video S305. Displaying a first comment panel in response to an interactive operation on a display area for the first video information by the first user, the first comment panel including a recommend control S306. In response to an operation on the recommend control by the first user, add the recommendation information by the first user to the first video information to obtain the second video information The third client S307. Recommends the video, the video including the second video information

Fig. 3

METHOD, APPARATUS AND ELECTRONIC DEVICE FOR PROCESSING OF VIDEO RECOMMENDATIONS

CROSS REFERENCE TO RELATED APPLICATIONS

This application is a continuation application of, and claims priority to, U.S. patent application Ser. No. 18/592,058, filed on Feb. 29, 2024, which is a continuation application of U.S. Pat. No. 11,936,954, issued on Mar. 19, 2024, and which claims priority to China Application No. 202111370575.9 filed on Nov. 18, 2021. The disclosures of the foregoing applications are incorporated here by reference.

TECHNICAL FIELD

The embodiments of the present disclosure relate to the field of computer technology, and in particular, to a method, apparatus, and electronic device for processing of video recommendations.

BACKGROUND

More and more users record and share their lives by way of recording videos, and videos have become an important approach for users to obtain information. In a video application, a user can recommend a video to other users, and other users can see the video recommended by the user in the private mailboxes with the user. Currently, video recommendations lack variety.

SUMMARY

Embodiments of the present disclosure provide a method, apparatus, and electronic device for processing of video recommendations.

In a first aspect, some embodiment of the present disclosure provides a method for processing of a video recommendations, comprising: receiving first video information, the first video information including: information of at least one of second users that recommended a video, and recommendation comment information by each second user for the video; displaying at least part of the first video information on a playback interface for the video; displaying a first comment panel in response to an interactive operation of a first user on a display area for the first video information, the first comment panel including: a recommend control; in response to an operation of the first user on the recommend control, adding recommendation information by the first user to the first video information to obtain second video information, the recommendation information including: at least one of first user information or recommendation comment information on the video by the first user; and recommending the video to a third user associated with the first user, the video including the second video information.

In a second aspect, some embodiment of the present disclosure provides a apparatus for processing of a video recommendations, comprising:

a transceiver module configured to receive first video information, the first video information including: information of at least one of second users that recommended a video, and recommendation comment information by each second user for the video;

a display module configured to display at least part of the first video information on a playback interface for the video, and display a first comment panel in response to an interactive operation of a first user on a display area for the first video information, the first comment panel including: a recommend control;

a processing module configured to add recommendation information by the first user to the first video information to obtain second video information in response to an operation of the first user on the recommend control, the recommendation information including: at least one of first user information or recommendation comment information on the video by the first user;

the transceiver module is further configured to recommend the video to a third user associated with the first user, the video including the second video information.

In a third aspect, some embodiment of the present disclosure provides an electronic device, comprising: a processor and a memory; the memory stores computer-executed instructions; the processor executes the computer-executed instructions stored in the memory, causing the processor to execute the method for processing of video recommendations as described above in the first aspect.

In a fourth aspect, some embodiment of the present disclosure provides a non-transitory computer-readable storage medium having computer-executed instructions stored thereon, which, when executed by a processor, implement the method for processing of video recommendations as described above in the first aspect.

In a fifth aspect, some embodiment of the present disclosure provides a computer program product, including computer instructions, which, when executed by a processor, implement the method for processing of video recommendations as described above in the first aspect.

The method, apparatus, and electronic device for processing of video recommendations are provided in the embodiments, the method comprising: at least one of second users can recommend a video to a first user, and when recommending the video, the second user can add his/her own recommendation comment on the video, and the first user sees the comment on the video from the at least one of second users on a playback interface of a first client, and can also conduct operations such as comment, like, etc. on the comment by the second user, and can further recommend the video to a third user.

BRIEF DESCRIPTION OF THE DRAWINGS

In order to illustrate technical solutions in embodiments of the present disclosure or the related art more clearly, the following will briefly introduce the accompanying drawings needed in the description of the embodiments or the related art. Obviously, the accompanying drawings in the following description are some embodiments of the present disclosure, and for those of ordinary skill in the art, other drawings may further be obtained in accordance with these drawings without any creative effort.

FIG. 3 is a schematic flowchart of a method for processing of video recommendations provided by an embodiment of the present disclosure;

DETAILED DESCRIPTION

In order to make the purposes, technical solutions and advantages of the embodiments of the present disclosure clearer, the technical solutions in the embodiments of the present disclosure will be clearly and completely described below with reference to the accompanying drawings in the embodiments of the present disclosure. Apparently, the described embodiments are some, but not all, of embodiments of the present disclosure. Based on the embodiments in the present disclosure, all other embodiments obtained by those of ordinary skill in the art without creative efforts shall fall within the scope claimed by the present disclosure.

Figure 1:
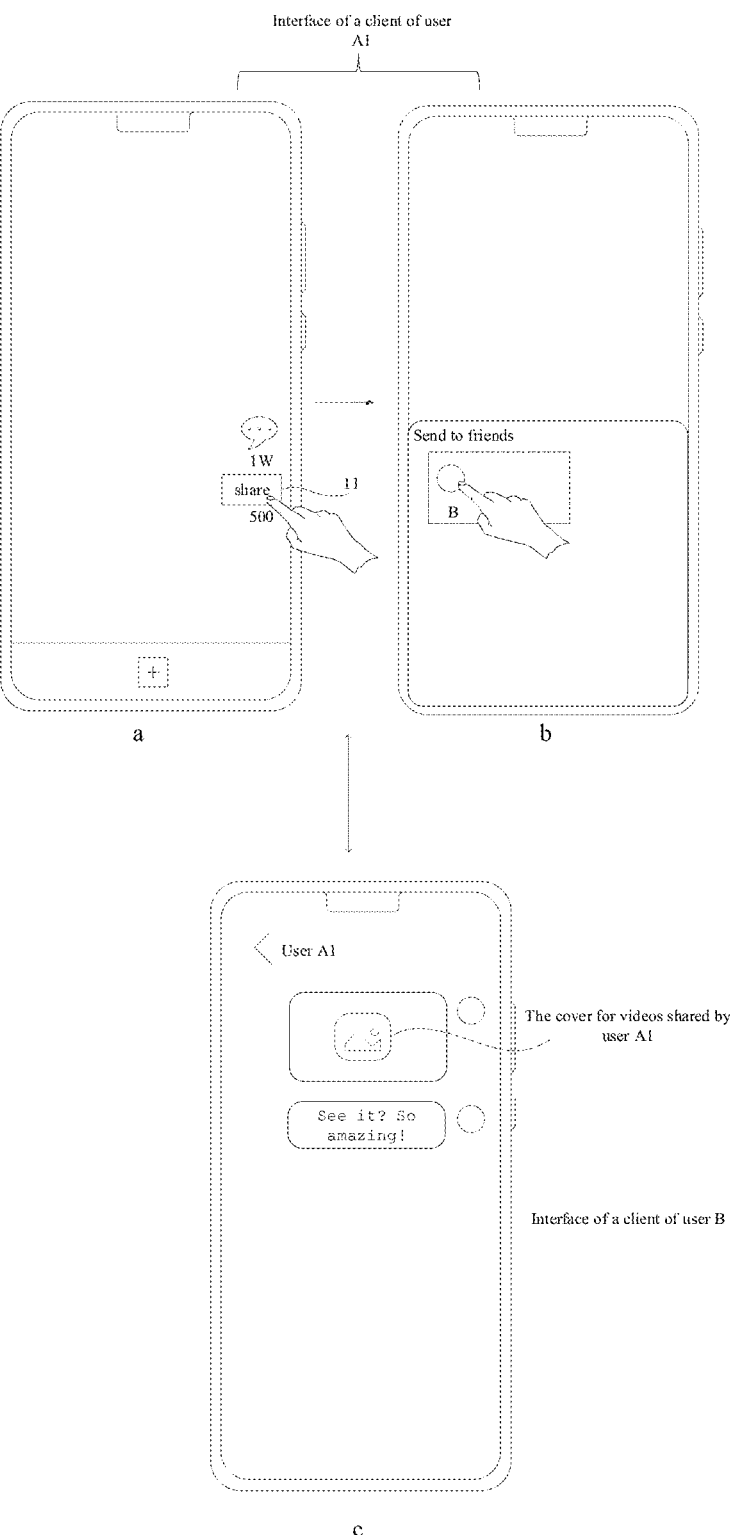
FIG. 1 is a schematic diagram of an existing interface of a client.

FIG. 1 is a schematic diagram of an existing interface of a client. Taking a short video application as an example in FIG. 1, a in FIG. 1 shows an interface for the client to play a short video. The interface for the short video includes: a short video sharing control 11, which can be clicked by user A1 to share the short video to user B. Illustratively, referring to b in FIG. 1, after a user clicks on the short video sharing control 11, the client may display a sharing interface, which may include: an identifier of at least one user. In FIG. 1, taking the at least one user being user B as an example, user A1 can select the identifier of user B on the sharing interface to share the short video with user B. The identifier of the user may be an avatar, name, etc. of the user, which is not limited in the embodiments of the present disclosure. It should be understood that none of the drawings in the embodiments of the present disclosure shows a picture of a video played by a client.

Accordingly, user B can receive the short video shared by user A1 in a private mailbox of the short video application of own client. C in FIG. 1 shows an interface for the client of user B, which is a private message interface between user B and user A1. The private message interface may comprise: a short video shared by user A1 to user B, which can be clicked by user B to watch the short video.

At present, the way users share short videos by using private mailboxes is on a one-to-one basis. For example, only user B shares and communicates feelings or comments on short videos with user A1, the sharing method lacks variety. If multiple users want to share (or recommend) the short videos, in the related art, the multiple users cannot communicate all together, which affects the user experience. It should be understood that FIG. 1 takes a short video as an example, and the method for processing of video recommendations in the embodiment of the present disclosure can also be applied to other types of video sharing (or recommendation) scenarios. In the following embodiments, "video recommendation" and video being short video are taken as examples for illustration.

In view of these issues in the related art, an embodiment of the present disclosure provides a method for processing of video recommendations. At least one of second users can recommend a video to a first user, and when recommending the video, the second user can add own recommendation comment on the video, and when the first user encounters the short video, and the first user sees the comment on the video from the at least one of second users on a playback interface of a first client, and can also conduct operations such as comment, like, etc. on the comment by the second user, and can further recommend the video to a third user to achieve the purpose that multiple people can communicate and comment on the video at the same time, thereby improving the user experience of recommending videos.

In one embodiment, a client in an embodiment of the present disclosure may be provided in a terminal, and operations of a user on the client in following embodiments can also be understood broadly as operations of the user on the terminal. Because the client is carried on the terminal, the client is characterized by the terminal (such as a mobile phone) in the drawings.

In one embodiment, a terminal can be a wireless terminal or a wired terminal. A wireless terminal may refer to a handheld device with a wireless connection function installed with corresponding software (or a client), or other processing device connected to a wireless modem. A wireless terminal can communicate with one or more core network devices via a Radio Access Network (RAN), and the wireless terminal can be a mobile terminal, such as a mobile phone (or referred to as a "cellular" phone) and a computer with a mobile terminal, for example, it can be a portable, pocket-sized, handheld, computer built-in or vehicle-mounted mobile apparatus that exchanges language and/or data with a wireless access network. For another example, the wireless terminal may also be a Personal Communication Service (PCS) phone, a cordless phone, a Session Initiation Protocol (SIP) phone, or a Wireless Local Loop (WLL) station, a Personal Digital Assistant (PDA) and other devices. A wireless terminal may also be referred to as a system, a Subscriber Unit, a Subscriber Station, a Mobile Station, a Mobile, a Remote Station, a Remote Terminal, an Access Terminal, a User Terminal, a User Agent, a User Device or User Equipment, which is not limited here. Optionally, the above terminal may also be a smart watch, a tablet, a wearable device, etc., which is not limited in the embodiments of the present disclosure. In the following embodiments and the accompanying drawings, a terminal being a mobile phone is taken as an example for illustration.

Figure 2:
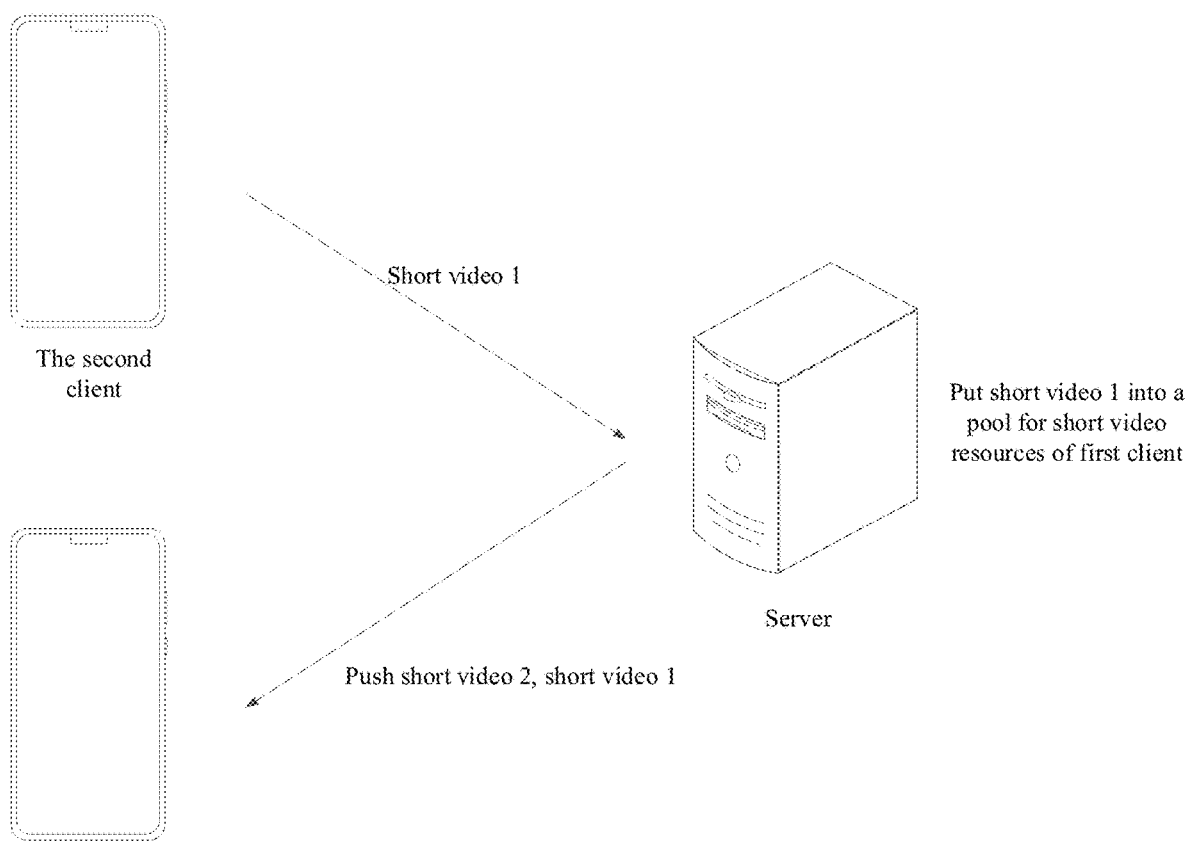
FIG. 2 is a schematic diagram of a scenario to which the method for processing of video recommendations provided by an embodiment of the present disclosure is applicable.

Before introducing the method for processing of video recommendations provided by an embodiment of the present disclosure, the process of a user watching a short video in a short video application is described in combination with following scenario:

Referring to FIG. 2, the scenario may include: a first client, a server, and at least one second client. In FIG. 2, the number of second clients being one is taken as an example for illustration. The server can be a server for a short video application. In FIG. 2, a user watching a video uploaded by the second client on the first client is taken as an example for illustration.

Illustratively, the second user to which the second client belongs can upload short video 1 in the short video application of the second client (that is, the second client can send the short video 1 to the server), and after the server receives the short video 1, the short video 1 can be placed in a resource pool for short videos of the first client (or other clients). The resource pool for short videos of the first client includes: a plurality of short videos to be pushed to the first client.

It should be understood that the embodiment of the present disclosure does not limit the manner in which order the server pushes the short videos in the resource pool for short videos to the first client, and the embodiment of the present disclosure focuses on the ability of the server to push short videos to the first client 1. In this way, after receiving the short video 1, the first client can play the short video 1. It should be noted that when the server sends the short video 1 to the first client, it can send a separate short video 1 to the first client, or the server can send to the first client a stream of short videos, which contains a plurality of short videos, and the short video 1 is included in the stream of short videos.

Similarly, in the embodiment of the present disclosure, when the second user recommends a video to the first user, the video is also sent by the second client to the first client through the server. Referring to FIG. 1, in the related art, when the server receives a request for recommending a video from the first client, it can directly send the video to the first client, and after receiving the video recommended by the second client, the first client can display the video recommended by the second user on a private message interface for "the second user and the first user". Different from the related art in FIG. 1, in the embodiment of the present disclosure, when the second user recommends a video to the first user, the server can store the video in the resource pool for short videos of the first client, and then push the video to the first client. When watching short videos in the video application, the first user can encounter (i.e., see) the video recommended by the second user. For details, refer to the description in the following embodiments.

The method for processing of video recommendations provided by the embodiments of the present disclosure will be described below with reference to specific embodiments. The following embodiments may be combined with each other, and the same or similar concepts or processes may not be repeated in certain embodiments. FIG. 3 is a schematic flowchart of a method for processing of video recommendations provided by an embodiment of the present disclosure. FIG. 3 illustrates the method for processing of video recommendations provided by an embodiment of the present disclosure from the perspective of interaction between a first client, a second client, and a server.

Referring to FIG. 3, the method for processing of video recommendations provided by an embodiment of the present disclosure can comprise:

S301, the second client plays a video.

S302, in response to an operation by the second user on a video sharing control on a playback interface for the video, the second client displays a sharing interface.

The second client belongs to the second user, and the user who operates the second client may be the second user or other users. In the embodiment of the present disclosure, the user who operates the second client being the second user is taken as an example for illustration. In one embodiment, a playback interface for the video may be simply referred to as a video interface.

When the second client plays a video, the video interface includes: a video sharing control. By operating the video sharing control, the user can trigger the second client to display a sharing interface. The sharing interface may include: an identifier of at least one user, and the at least one user may be a friend of the second user, or a user followed by the second user (as shown in b in FIG. 1). The identifier of the user may include, but is not limited to, an avatar, name, and the like, of the user. It should be understood that, in the embodiment of the present disclosure, operations by the user on the controls displayed on the interface of the client may include, but not limited to, click, double-click, slide, and the like, which are not limited in the embodiment of the present disclosure.

Figure 4:
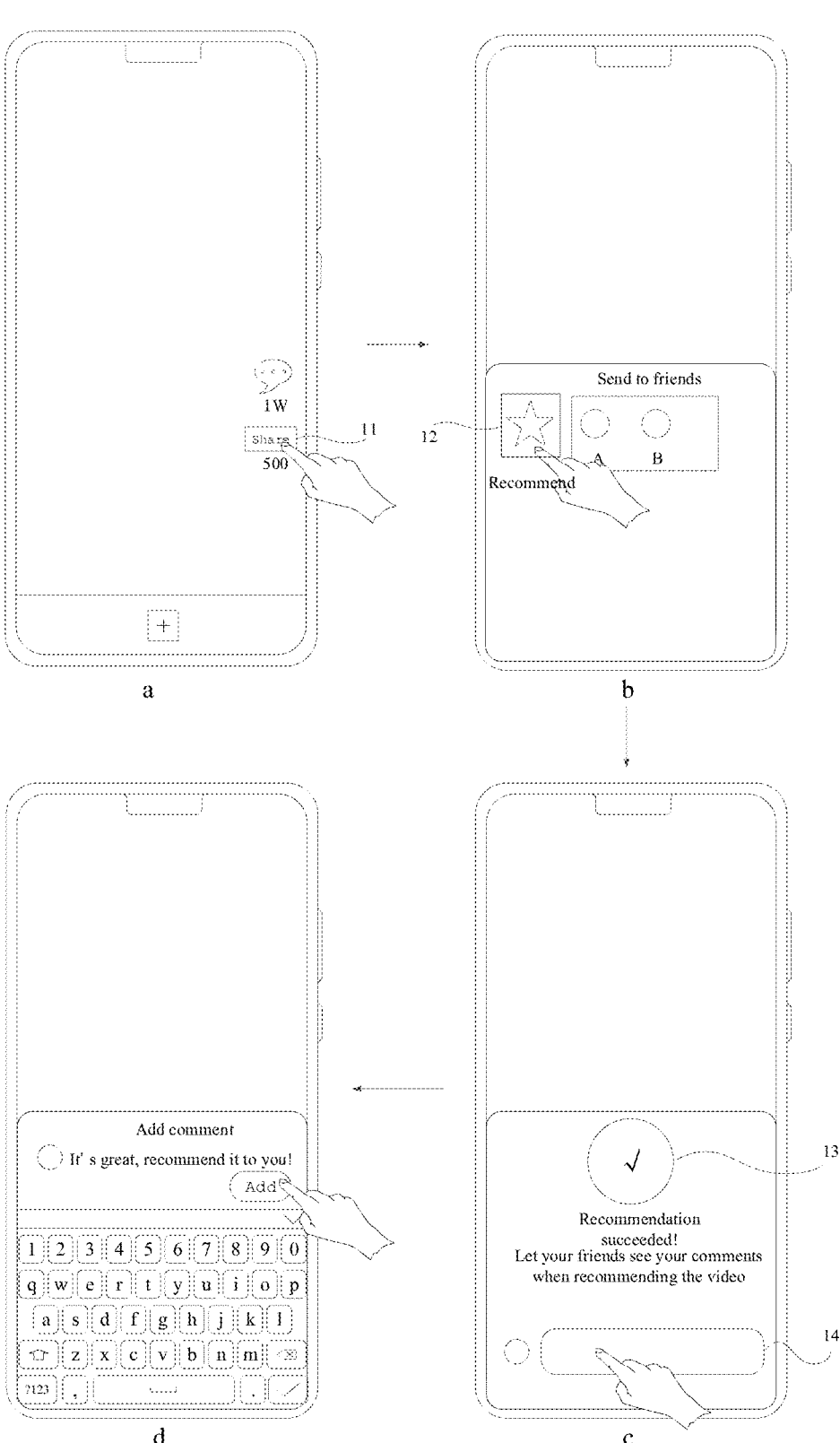
FIG. 4 is a schematic interface diagram of a client to which an embodiment of the present disclosure is applicable.

Different from the sharing interface in the related art (e.g., b in FIG. 1), the sharing interface in the embodiment of the present disclosure may further include: a recommend control. The second user operates the recommend control and can recommend the video to other users. Illustratively, a shown in FIG. 4 is a video interface, such as, the interface for playing short video 1 by the second client, and the interface for short video 1 includes: a video sharing control 11. The user operates the video sharing control 11, and the second client can display the sharing interface. As shown in b in FIG. 4, the sharing interface may include: an identifier of at least one user (such as an identifier of user A, an identifier of user B), and a recommend control 12. The b in FIG. 4 is characterized by using a circle as the user's avatar.

S303, in response to an operation of the recommend control on the sharing interface by the second user, the second client recommends the video to the first client.

In one embodiment, the video recommended by the second client to the first client may include: second user information. The second user information may include: an identifier of the second user. The identifier of the second user may include, but is not limited to, a name, an avatar, and the like of the second user.

In one embodiment, the recommendation of the video by the second client to the first client may specifically be: the second client sends a recommendation indication to a server. The recommendation indication is used to indicate the server to send the video recommended by the second user to the users set by the second user to be shared with. In the embodiment of the present disclosure, the server stores identifiers of users set by the second user to be shared with. Therefore, in response to receiving the recommendation indication from the second user, the server can query the users set by the second user to be shared with. The process of setting users to be shared with by the second user can be referred to the relevant description of "set users to be shared with by the first user" in the following embodiments, which will not be repeated here.

In the embodiment of the present disclosure, a user set by a second user to be shared with is referred to as a first user, and a client corresponding to the first user may be referred to as a first client, and the user using the first client may also be other users. In the embodiment of the present disclosure, the first user is taken as an example for illustration. It should be understood that the first user is associated with the second user, for example, the first user and the second user follow each other, or the second user follows the first user, or the first user follows the second user.

The following takes the process of a second user recommending short video 1 to a first user (that is, the second client pushes the video to the first client through a server) as an example.

Illustratively, short video 1 is played on an interface of the second client, and the second user operates a recommend control on a sharing interface, which can trigger the second client to send a recommendation indication to the server. The recommendation indication is used to instruct the server to send the short video 1 to the first client of the first user.

As shown in b in FIG. 4, if the second user has not recommended the short video 1, the recommendation state of the recommend control 12 is in a non-recommended state, which is characterized by a hollow (white) pentagram in b in FIG. 4. If the second user has recommended the short video 1, the recommendation status of the recommend control 12 is in a recommended status, which, illustratively, may be characterized by a solid (black) pentagram in the drawings.

When the second user has not recommended the short video 1, if the second user operates the recommend control 12 on the sharing interface, the second client may send a recommendation indication to the server. Accordingly, the second client may display an interface for a successful recommendation. As shown in c in FIG. 4, a "checkmark" 13 may be included on the interface for the successful recommendation, to indicate that the second user has successfully recommended the video 1 to the first user.

In one embodiment, on the interface for a successful recommendation may further include: a comment publishing area 14. The comment publishing area 14 is used to prompt the second user to post (append) a comment on the video that he/she has recommended. Illustratively, as shown in d in FIG. 4, the second user may input text information of "It's great, I recommend it to you" in the comment publishing area 14. In this embodiment, the second client may also send the recommendation comment information of the video by the second user to the server. It should be understood that, in the comment publishing area 14, the second user can not only input text, but also insert an audio, a video, an image, and an Emoji.

It should be understood that the interface for successful recommendation may further include: information for prompting a user to input a recommendation comment in the comment publishing area 14. For example, when it is the first time that the second user recommends a video, the information for prompting the user to enter a recommendation comment in the comment publishing area 14 may be "When you recommend a video, your friends will see it", and when it is not the first time that the second user recommends a video, the information for prompting the user to input a recommendation comment in the comment publishing area 14 may be "Let your friends see your comment when recommending a video". Taking the recommendation information for prompting the user to enter a comment in the comment publishing area 14 as an example, here, the purpose of using the first time and not the first time for descriptions is: when it is the first time that the user recommends a video, the recommendation and comment are explained for the user for as much detail as possible, and when it is not the first time that the user recommends a video, the user already knows how to recommend and comment, so the user can be prompted with a brief message to make the interface conciseness.

In one embodiment, the comment publishing area 14 can be provided on a sharing interface, and the second user can input a recommendation comment on a video in the comment publishing area 14 after operating the recommend control 12, and in turn, the second client can make the recommendation comment information of the second user on the video to be carried in a recommendation instruction and send it to a server.

It should be understood that, after the second user recommends short video 1, the state of the recommend control 12 on the sharing interface may change from a non-recommended state to a recommended state, for example, the recommend control 12 changes from a hollow pentagram to a solid pentagram.

Figure 5:
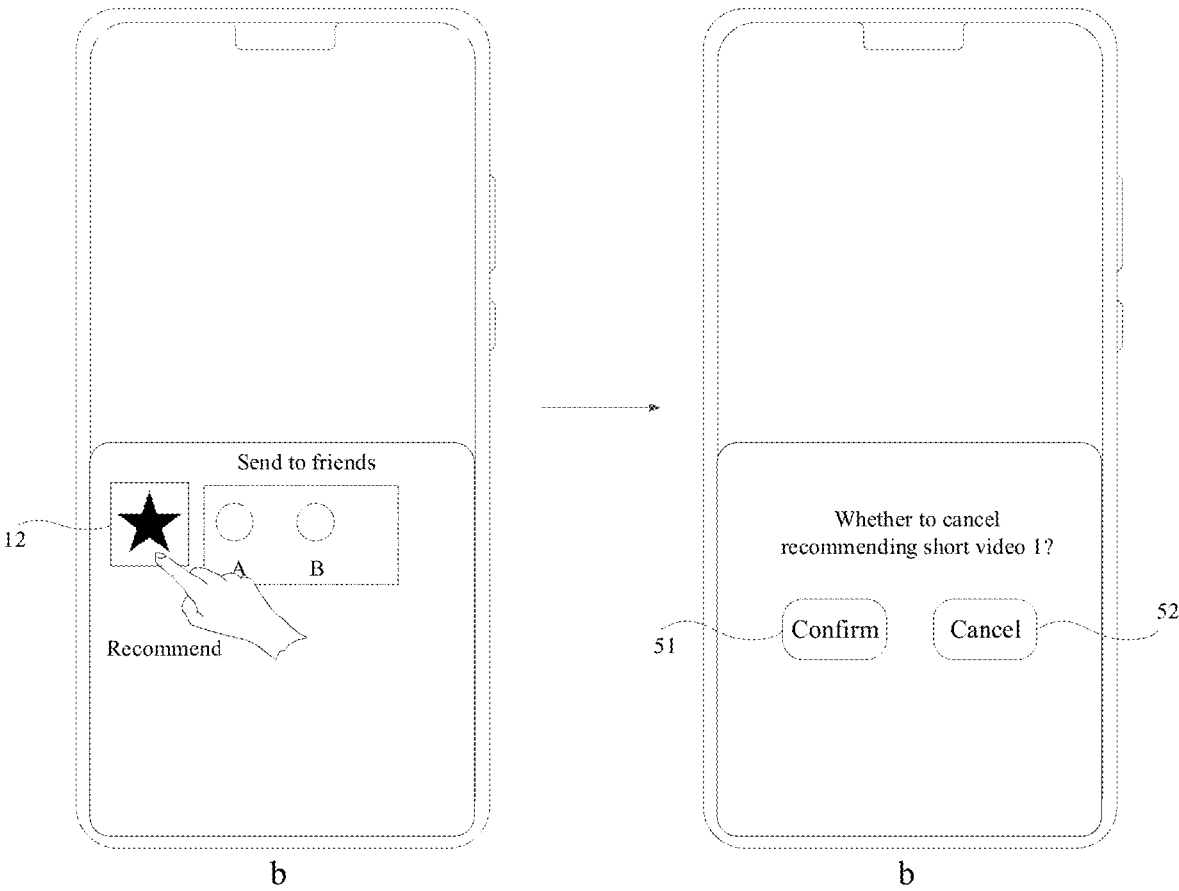
FIG. 5 is another interface schematic diagram of a client to which an embodiment of the present disclosure is applicable.

It should be noted that when the second user has recommended the short video 1, referring to FIG. 5, b in FIG. 4 can be replaced with a in FIG. 5, that is, the recommend control 12 is in the recommended state, for example, the recommend control 12 is a solid Pentagram. In this scenario, because the second user has already recommended the short video 1, when the second user operates the recommend control 12 on the sharing interface, the client may be triggered to display an interface for canceling the recommendation. As shown in b in FIG. 5, the interface for canceling the recommendation may include information for prompting the user whether to cancel the recommendation for the short video 1, such as text information "Whether to cancel the recommendation", and a confirmation control 51 and a cancel control 52. When the second user wants to cancel the recommendation for the short video 1, he/she can operate the confirmation control 51 to trigger the second client to cancel the recommendation for the short video 1. Accordingly, the state of the recommend control 12 on the sharing interface can be changed from recommended state to non-recommended state, for example, the recommended control 12 changes from a solid pentagram to a hollow pentagram.

Accordingly, in response to the recommendation indication, the server may send a first video information to the first client. Accordingly, the first client can receive the first video information.

After receiving the recommendation indication from the second client, the server can place the video recommended by the second user (e.g., short video 1) in a resource pool for short videos of the first client to push short video 1 to the first client. Wherein, when the server pushes the video recommended by the second user to the first client, it can send first video information to the first client, the first video information including: information of at least one of second users that recommended the video (such as short video 1), and recommendation comment information by each second user for the video. In one embodiment, the first video information may further include video data, such as data of short video 1. The recommendation comment information on the video by the second user may be referred to as the recommendation comment information of the second user.

The recommendation comment information of the second user is text information such as "It's great, I recommend it to you". As for why the first video information includes at least one of second users instead of only one second user, it is because: after the server places the short video 1 in the resource pool for short videos of the first client, it may not immediately push the short video 1 to the first client. During this process, the server can also receive recommendation indications of the short video 1 from users set by other second users to be shared with (which overlaps with the users to be shared with set by the above second user. In the embodiment of the present disclosure, the first user belonging to the user to be shared with set by two second users is taken as an example for illustration). Therefore, when the server pushes the short video 1 to the first client, the first video information may include the short video 1, and the short video 1 may be recommended by at least one of the second users, and the first video information may also include recommendation comment information for the short video 1 by each second user.

S304, the first client displays at least part of the first video information on a playback interface for the video.

After receiving the first video information, the first client can parse the first video information to obtain the information of at least one of the second users, and recommendation comment information on the video from each second user. The embodiments of the present disclosure do not have limitations on analysis processes and methods. The first client can play a video. Different from the client playing a video in the related art (a in FIG. 1), the first client can also display at least part of the first video information on a playback interface for the video. As shown in a in FIG. 1 above, the video interface does not contain recommendation comment information on short video 1 by other users.

Illustratively, for example, in the resource pool for short videos of the first client, the server arranges the short video 1 after the short video 2, and before the server pushes the short video 1 to the first client, the server also receives a recommendation indication from another second user (that is, the server receives recommendation indications for the video from two second users). If the first user is user A, and the second users include user B and user C, after user B has recommended short video 1 to user A, the server arranges short video 1 after short video 2, and before the server pushes short video 1 to the first client, the server also receives a recommendation indication from user C to user A, that is, the server receives recommendation indications for short video 1 from user B and user C, and the users to be sharing with of both user B and user C include the first user, so the first video information of the first client may include: information of user B, information of user C, and recommendation comment information on short video 1 by user B and user C. The information of user B may include an avatar, a name, etc. of user B and the information of user C may include an avatar, a name, etc. of user C.

The server can push the short video 2 to the first client, that is, send the short video 2 to the first client. Accordingly, the first client can play the short video 2 in response to receiving the short video 2, as shown in a in FIG. 6. Since there is no second user recommending the short video 2 to the first user, the interface played by the first client does not display comments by the second user. When the server pushes the short video 1 to the first client, it can send the first video information to the first client. Accordingly, when first user slides up the interface of the short video 2, the first client can play the short video 1. As shown in b in FIG. 6, the interface of the short video 1 may include: information of user B, information of user C, and recommendation comment information on the short video 1 by user B and user C. For example, the recommendation comment information on short video 1 by user B is "great, I recommend it to you", and the recommendation comment information on short video 1 by user C is "so amazing". It should be understood that b in FIG. 6 is taking the information of the user being the name of the user as an example for illustration.

Figure 6:
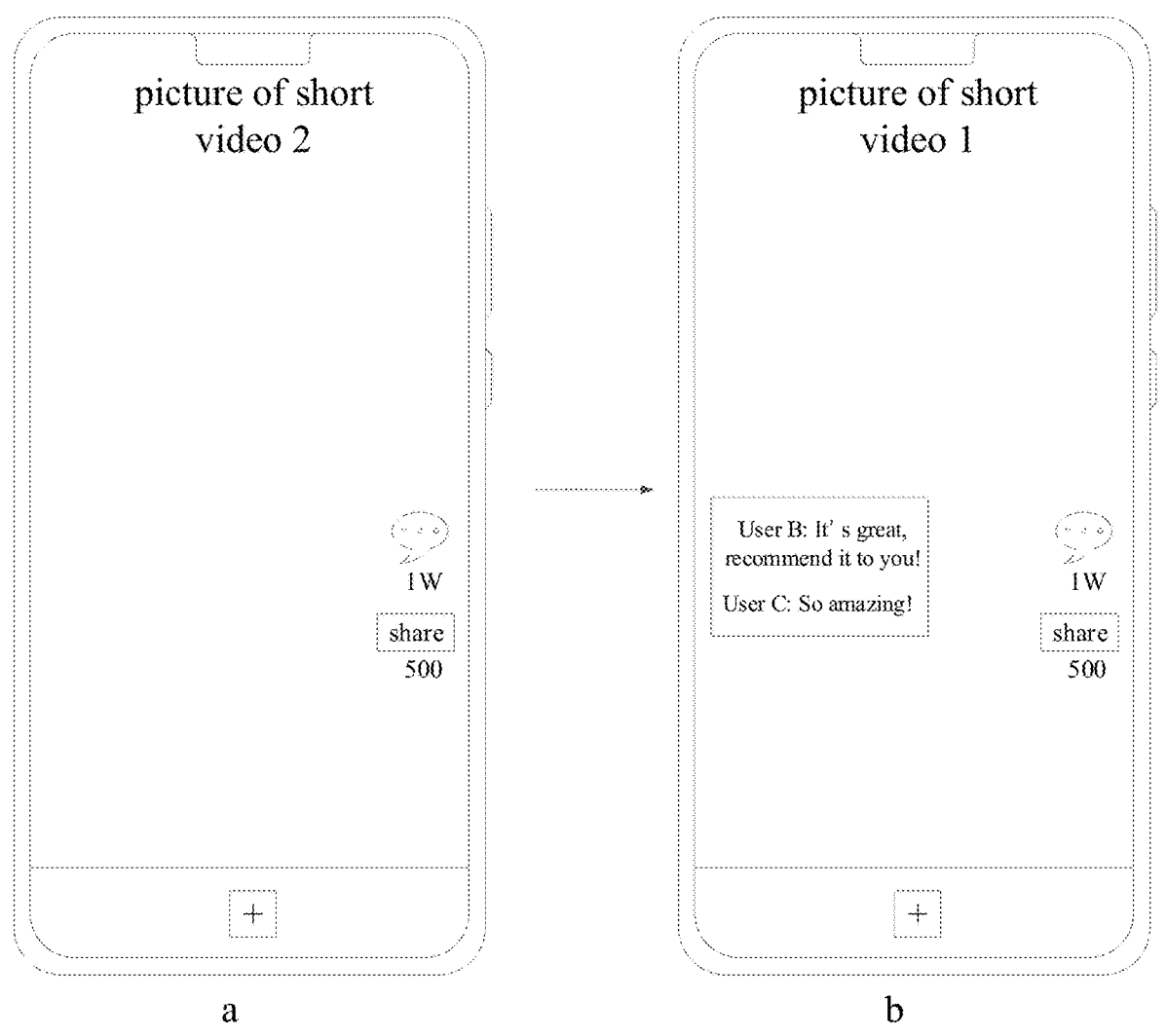
FIG. 6 is another interface schematic diagram of a client to which an embodiment of the present disclosure is applicable.

It should be understood that, in FIG. 6, the first client displaying the first video information on a playback interface for the video is taken as an example for illustration.

When the number of second users recommending short video 1 is relatively large, the recommendation comment information on short video 1 by these second users may occlude the picture of short video 1 played on the first client, affecting the viewing experience of the first user. Therefore, in the embodiment of the present disclosure, the first client can scroll and display the recommendation comment information on the short video 1 by each second user. Illustratively, b in FIG. 6 above may be replaced with FIG. 7.

Figure 7:
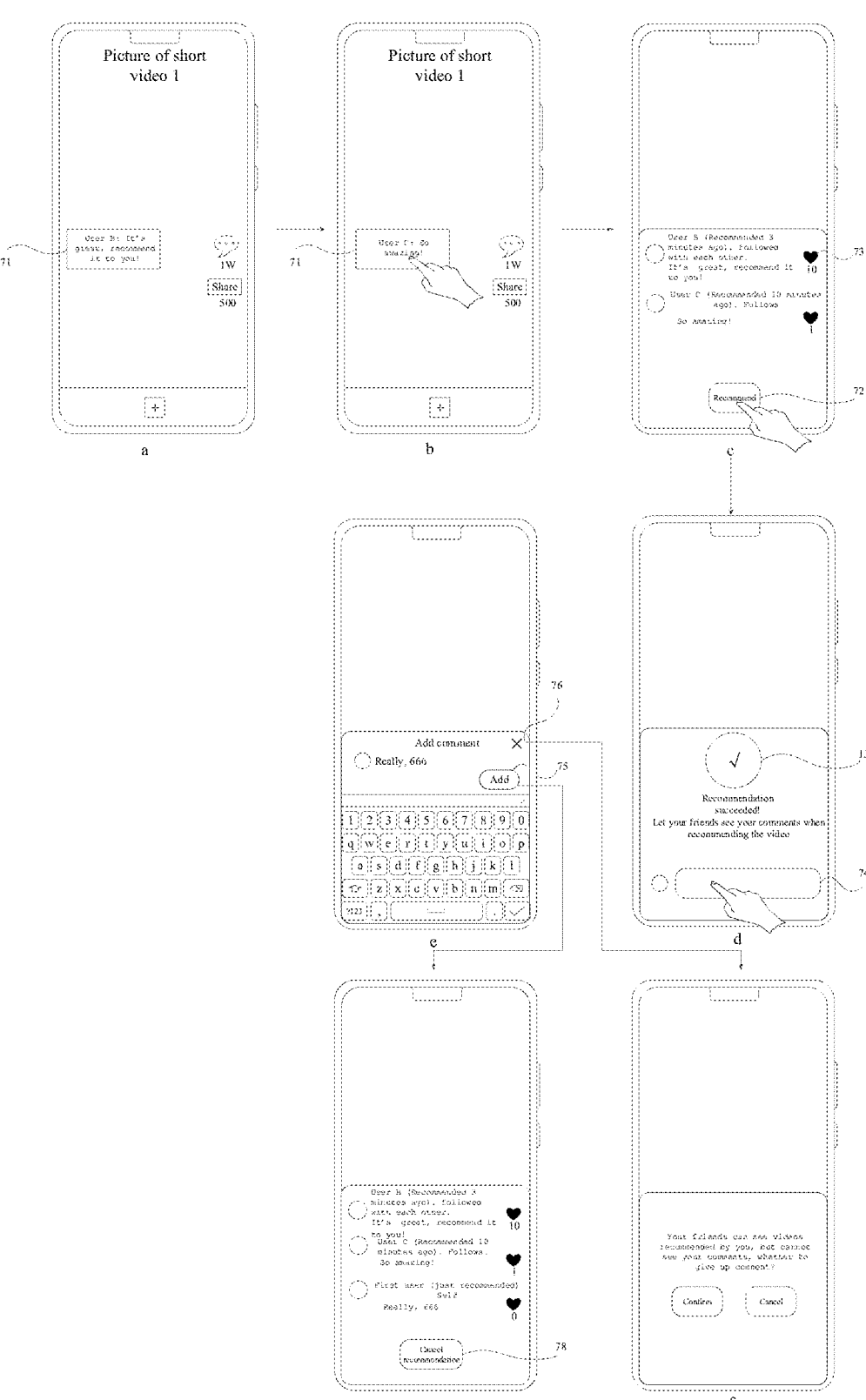
FIG. 7 is another interface schematic diagram of a client to which an embodiment of the present disclosure is applicable.

Referring to a in FIG. 7, the first client can display a recommendation area 71 on a video interface, and in the recommendation area 71, scroll and display avatars (or names) of user B and user C, as well as recommendation comment information on short video 1 by user B and user C. As shown in a in FIG. 7, what is displayed in the recommendation area 71 is the recommendation comment information on short video 1 by user B "great, I recommend it to you". As shown in b in FIG. 7, the recommendation comment information on short video 1 by user C "so amazing" can be scrolled and displayed in the recommendation area 71.

In one embodiment, regarding the first client scrolling and displaying the recommendation comment information on short video 1 by each second user, the first client can scroll and display the recommendation comment information on the short video 1 by each second user in order according to the time of recommendation comment information on the short video 1 by each second user from the nearest to the farthest. Alternatively, in one embodiment, in order to increase the attention of the first user to comments, the comments of the second user with a high degree of relevance to the first user may be scrolled and displayed first. In this embodiment, the first client can sequentially display an avatar (or a name) of each second user in descending order of the degree of relevance between the first user and each second user, and sequentially scroll and display recommendation comment information by each second user.

Wherein, the degree of relevance can be understood as the degree of closeness of relevance with the first user, for example, the degree of closeness of relevance of friends who follow each other is greater than that of one-way follow-up. One-way follow-up can be that the first user follows the second user, or the first user is followed by the second user, but the first user and the second user do not follow each other. The degree of closeness of relevance of one-way follow-up is greater than that of users who are not followed by each other.

Alternatively, in one embodiment, the degree of relevance can be understood as: the number of times (or frequency) of interactions with the first user, and the number of times of interactions with the first user can be understood as: the number of likes, the number of comments, and the number of private messages. The greater the number (or frequency) of interactions with the first user, the greater the degree of relevance between the second user and the first user.

In the embodiment of the present disclosure, the first user can see recommendation comment information on the short video 1 by at least one of second users on the interface of the short video 1, instead of seeing it in the private message with the second user for commenting in the related art, which can improve the recommendation range and comment range of the short video 1, so that the first user can see the comments from multiple second users.

S305, displaying a first comment panel in response to an interactive operation on a display area for the first video information by the first user, the first comment panel including a recommend control.

In the embodiment of the present disclosure, by operating the display area for the first video information by the first user, the first client can be triggered to display the first comment panel. Wherein, the first comment panel includes: a recommend control. The first user operates the recommend control, and can also set users to be shared with (the third user will be used below as an example for illustration).

In one embodiment, the first client may display a recommendation area on the video interface, and in the recommendation area, scroll and display recommendation comment information from at least one of the second users. In this embodiment, the first user's operation on a display area for the first video information, that is, the recommendation area, is the first user's operation on the recommendation area, that is, in response to the first user's operation on the recommendation area, the first client displays the first comment panel.

Illustratively, taking the first client scrolling and displaying the recommendation comment information from at least one of the second users as an example, referring to b in FIG. 7, by operating the recommendation area 71 by the user, the first client can be triggered to display the first comment panel. As shown in c in FIG. 7, the first comment panel may include: a recommend control 72. It should be understood that, in one embodiment, if the first user has already recommended the short video 1, the recommend control 72 may not be displayed in the first comment panel, or a control for canceling the recommendation may be displayed.

In one embodiment, the first comment panel may further include: information of each second user, and recommendation comment information on the short video 1 by each second user (for example, recommendation comment information on short video 1 by user B and user C), and the duration from the moment when each second user recommends short video 1 to current moment, for example, the duration from the moment when user B recommends short video 1 to current moment is 5 minutes. It should be understood that the second user information may be understood as a second user identifier.

In one embodiment, as shown in c in FIG. 7, in the first comment panel, each second user is also displayed with a like control 73 correspondingly, and the first user can like the comment of the second user. The number of liked users is also displayed around the like control corresponding to each second user.

In one embodiment, as shown in c in FIG. 7, in the first comment panel, each second user is also displayed with a relevance relationship with the first user correspondingly, for example, the second user is a user followed by the first user, or the second user and the first user follow each other, or the second user is not a user followed by the first user. In the embodiment of the present disclosure, from which users recommended videos can be received by the first user, and to which users to recommend videos, can be set in advance, which can be referred to the relevant description in FIG. 12 below. As shown in c in FIG. 7, it exemplarily characterizes a relevance relationship of follow up each other between user B and the first user, and user C is a user followed by the first user.

S306, in response to an operation on the recommend control by the first user, the first client adds the recommendation information by the first user to the first video information to obtain the second video information.

In response to the first user operating the recommend control in the first comment panel, the first client adds the recommendation information by the first user to the first video information to obtain the second video information.

Wherein, the recommendation information by the first user includes: information of the first user, and/or recommendation comment information on the video by the first user. Wherein, the first user information can be referred to the relevant description of the second user information above. As for whether the recommendation information by the first user includes the recommendation comment information on the video by the first user, it depends on whether the first user comments on the video. If the first user comments on the video, the recommendation information by the first user includes the recommendation comment information on the video by the first user, if the first user does not comment on the video, the recommendation information by the first user does not include the recommendation comment information on the video by the first user. Wherein, for the first user to comment on the video, reference may be made to the relevant descriptions in the following embodiments.

After the recommendation information by the first user is added to the first video information, the second video information can be obtained.

S307, the first client recommends the video to a third user associated with the first user, the video including the second video information.

By operating the recommend control in the first comment panel by the first user, the first client can be triggered to recommend the video to clients of users set by the first user to be shared with. Wherein, the video includes the second video information, and the second video information includes: the first video information and the first user information.

In one embodiment, the first client may send a recommendation indication to a server in response to the first user's operation on the recommend control, where the recommendation indication is used to indicate the server to push the video to the users set by the first user to be shared with, that is, to indicate the server to send the second video information to the users set by the first user to be shared with, which can be referred to the relevant description of "the second client recommends a video to the first client" in S303-S304. Wherein, in the embodiment of the present disclosure, the third user is used to characterize a user set by the first user to be shared with. Wherein, the third user may include at least one of the second users above.

In one embodiment, S307 may be replaced with: the first client recommends the video to a client of a third user associated with the first user, the video including the second video information. It should be understood that the interaction of a client is taken as an example for illustration in FIG. 3.

After the client of the third user receives the second video information from the server, it can play the video and display on the video interface: the information of the first user, the information of user B, the information of user C, and the recommendation comment information for short video 1 by user B and user C, as shown in a and b in FIG. 7. Wherein, if the second video information includes recommendation comment information on the short video 1 by the first user, the client of the third user can also display the recommendation comment information on the short video 1 by the first user on the interface for playing the short video 1. The recommendation comment information on the video by the first user may be referred to as the recommendation comment information by the first user.

In one embodiment, when the first user operates the recommend control on the first comment panel, the first terminal can send recommendation information by the first user to "at least one of second users" (i.e., all of the second users who have recommended the video to the first user) to prompt the second user that the first user has recommended the video recommended by the second user again. In one embodiment, the second terminal may display the recommendation information by the first user on the message interface of the application that plays the video. For details, refer to the relevant description in FIG. 11.

In this way, after the second user has recommended the video to the first user, it can also see that the first user recommends again the video, and recommendation comment information on the video from the first user, and the users can communicate and discuss with each other.

The method for processing of video recommendation provided in an embodiment of the present disclosure comprises: at least one second user can recommend a video to a first user, when recommending the video, the second user can add his/her own recommendation comment on the video, and when the first user encounters the short video, the first user can see comment on the video by at least one of second users on a playback interface for the video, and can also conduct operations such as comment, like, etc. on the comment by the second user, and can also recommend the video to a third user to achieve the purpose that multiple people can communicate and comment on the video at the same time, thereby improving the user experience of recommending videos.

As described above, the first user can receive a video recommended by at least one second user, and when the video is played, a comment on the video by at least one of the second users is displayed. Further, the first user can also recommend the video to a third user, to achieve the purpose that multiple people comment on the video at the same time and recommend it. The following embodiments describe operations that the first user can perform on the video recommended by at least one of second users on the basis of the above embodiments:

First, a first user makes a comment on a video recommended by at least one of the second users, and recommends it to a third user.

Referring to c in FIG. 7, a first client may display a comment input interface in response to an operation on a recommend control 72 by the first user, the comment input interface being similar to c in FIG. 4 above. Referring to d in FIG. 7, the comment input interface may include: a comment publishing area 74. The comment publishing area 74 is used to prompt the first user to post (append) a recommendation comment to the video (e.g., short video 1) that he/she has recommended. Illustratively, the first user may click on the comment publishing area 74 to trigger the first client to display a comment interface, as shown in e in FIG. 7. On the comment interface, the first user can input recommendation comment information: "really 666" in the comment publishing area 74.

In one embodiment, the comment interface may further include an "add control" 75. After the first user inputs the recommendation comment information: "really 666" in the comment publishing area 74, he/she can click the "add control" 75, so that the first client can send the recommendation comment on the video by the first user to a server. In other words, in response to the comment "really 666" on the video input by the first user in the comment publishing area, the first client may add the recommendation comment information "really 666" commented on the video by the first user to second video information. The comment input interface in the embodiment of the present disclosure may refer to the relevant description of the above interface for successful recommendation.

In one embodiment, the comment interface may further include a close control 76, and the first user clicks the close control 76 to cancel the recommendation comment on the video. Illustratively, the first user clicks the close control 76, and the first client may display an interface prompting the first user "whether to give up comment", and the interface may display prompt information: "Your friends can see the video you recommend, but not your comment, whether to give up comment", as well as a cancel control and an abandon control, as shown in f in FIG. 7. Wherein, if the first user clicks on the abandon control, the first client may display the first comment panel, and if the first user clicks on the cancel control, the user may continue to edit comments on the comment interface.

In one embodiment, the comment input interface may further include: information characterizing that the first user has made a successful recommendation, such as a "checkmark" 13.

In this way, in this embodiment, because the first user also commented on the short video 1 shared with the third user, the second video information above includes: recommendation comment information on the short video 1 by the first user (e.g., user A), in addition to the information of the first user, the information of user B, the information of user C, and recommendation comment information on the short video 1 by user B and user C. Accordingly, after receiving the second video information from the server, the client of the third user can play the video, and display the recommendation comment information on the short video 1 by, such as, user A, user B, and user C on the video interface, which can achieve the purpose that multiple users can recommend, comment and communicate on the same video.

In this embodiment, as shown in e in FIG. 7, after the first user operates the "add control" 75, the first client can display a second comment panel, as shown in g in FIG. 7. Because the first user comments on the video, the second comment panel may display an identifier of the first user (first user information), recommendation comment information of the first user, and the identifier of the first user is "self", and other descriptions of the second comment panel can refer to the relevant description of the first comment panel. In one embodiment, because the first user has already recommended the short video 1, the second comment panel can display a cancel recommend control 77.

Wherein, the first user clicks an identifier of any user on the comment panel (the first comment panel and the second comment panel), and the first client can display the homepage of any user.

Second, the first user operates the comments on the comment panel (the first comment panel and the second comment panel).

Figure 8:
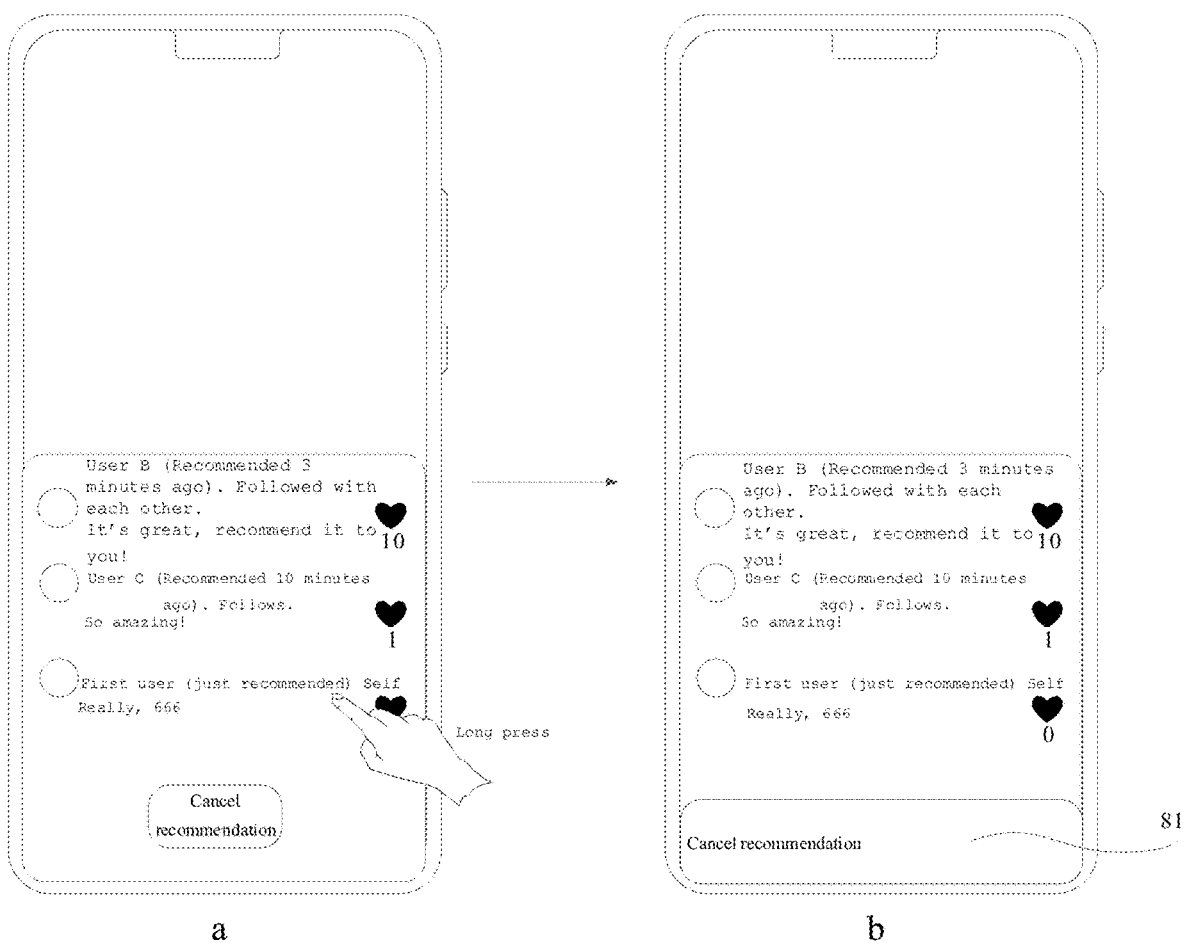
FIG. 8 is another interface schematic diagram of a client to which an embodiment of the present disclosure is applicable.

Taking the second comment panel as an example, referring to FIG. 8, a in FIG. 8 is the same as g in FIG. 7 above. In a in FIG. 8, the first user can long press any comment to trigger the first client to display a comment operation interface. As shown in b in FIG. 8, a delete recommend control 81 may be included on the comment operation interface. The delete recommend control 81 is used to indicate the first user to delete the recommended short video 1.

In response to the first user operating the delete recommend control 81, the first client can send an indication to delete the recommended short video 1 to a server. In response to receiving the indication, the server can delete the short video 1 in a resource pool for short videos of other clients, or delete the first user's comment in the video information sent to other clients, and characterize information of the short video 1 recommended by the first user.

In one embodiment, the first user can long press the recommendation comment information of the first user to trigger the first client to display a delete control, and in response to the first user operating on the delete control, the first client can delete the recommendation comment information of the first user on the second comment panel.

In one embodiment, the comment operation interface may further include a copy control, a translate control, a comment control, etc., which are not shown in FIG. 8. The copy control is used for the first client to copy the comment selected by the first user, the translate control is used for the first client to translate the comment selected by the first user, and the comment control is used to indicate the first client to display a comment box, where the user can make comment on the comment selected by the first user. In this embodiment, if the user makes comment on the comment selected by the first user, the first client may make the comment by the user on the recommendation comment selected by the first user to be carried in the second video information, so that when the client of a third user is displaying a recommendation area, the comment by the first user on the recommendation comment by the second user can be displayed in the recommendation area.

Third, on the interface of the first client for playing the video (such as short video 1) recommended by the second user, a video forwarding control may also be included, and the first user can directly re-recommend (or re-forward) the video recommended by the second user on the video interface.

Figure 9:
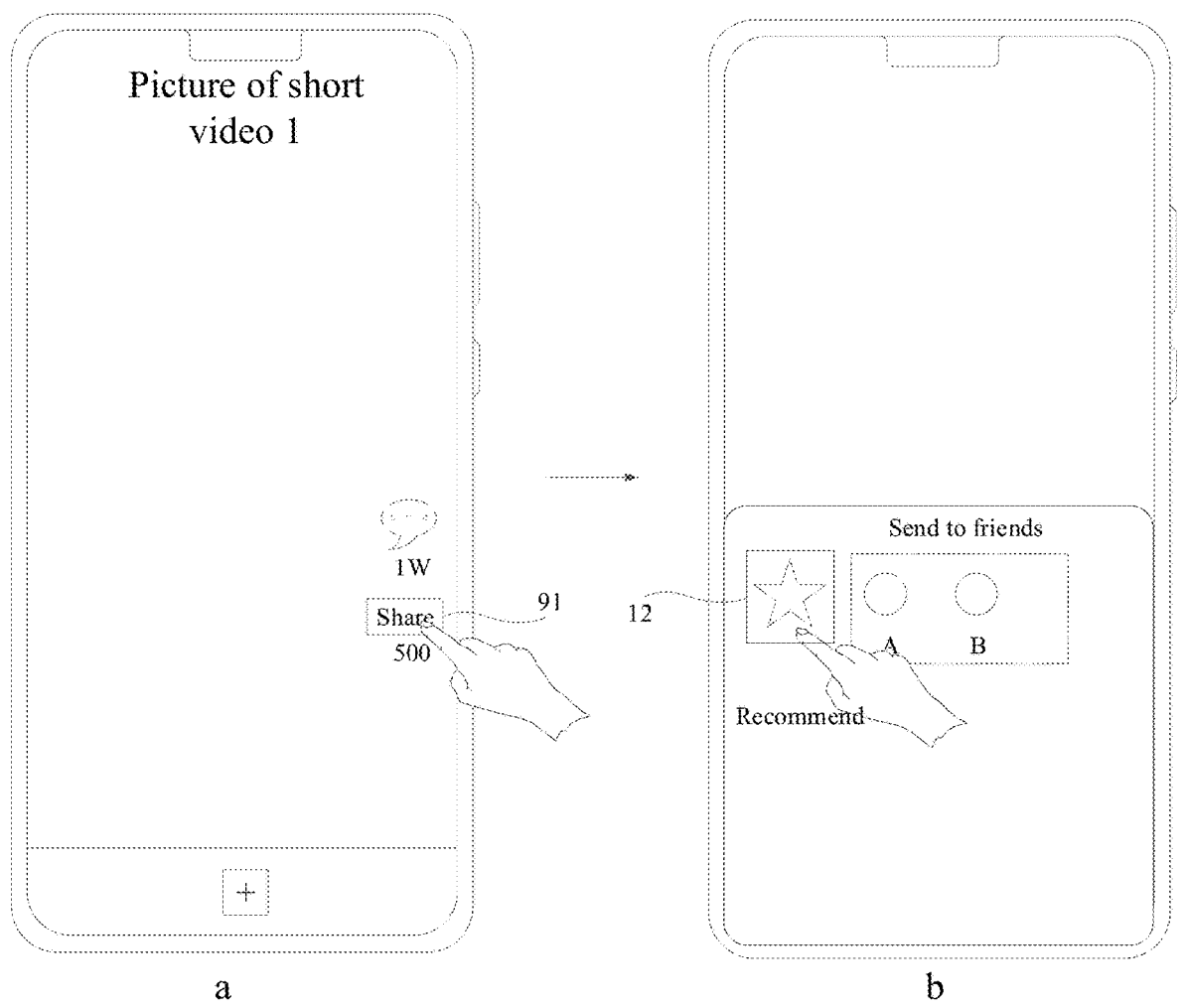
FIG. 9 is another interface schematic diagram of a client to which an embodiment of the present disclosure is applicable.

Referring to FIG. 9, a in FIG. 9 is the same as a in FIG. 7, and the video interface of the short video 1 may further include: a video forwarding control 91 (i.e., the video sharing control 11 in FIG. 1 above). The user operates the video forwarding control 91, and the first client can display a forwarding interface. Referring to b in FIG. 9, the forwarding interface includes: a recommend control 12. In one embodiment, the forwarding interface is the sharing interface in S302 above, and other introductions of the forwarding interface can refer to the relevant description of the sharing interface in S302-S303 above.

Wherein, if the first user has recommended the short video 1 to the third user, the recommend control 12 is in a recommended state, which reference can be made to the relevant description in S302 above. In this scenario, in response to the first user operating the recommend control 12, the first client may display an interface for canceling the recommendation.

The interface for canceling the recommendation is used to prompt the user whether to cancel the recommendation of the video. The interface for canceling the recommendation can refer to the relevant description in S303. Wherein, when the user operates the recommend control 12, the first client changes the state of the recommend control 12 to a non-recommended state in response to the first user canceling the operation of recommending the video (i.e., clicking on the recommend control 12), and the non-recommended state characterizes that the first user has not recommended the video.

Fourth, on the interface of the first client for playing the video (such as short video 1) recommended by the second user, a homepage control may also be included, and the first user may operate the homepage control to view videos recommended by himself/herself.

Figure 10:
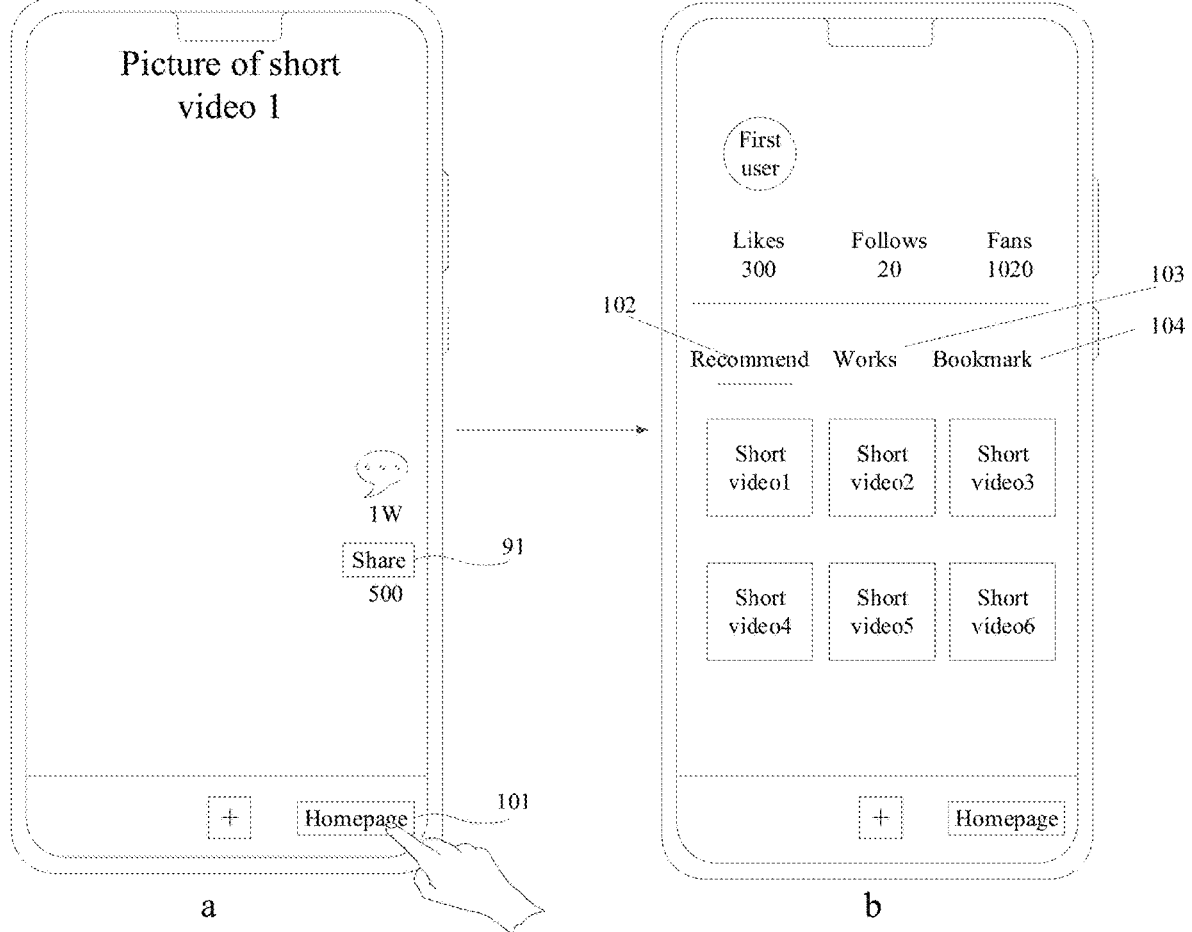
FIG. 10 is another interface schematic diagram of a client to which an embodiment of the present disclosure is applicable.

Referring to FIG. 10, a in FIG. 9 may be replaced with a in FIG. 10, and the video interface of the short video 1 may further include: a homepage control 101. The user operates the homepage control 101, and the first client can display a homepage interface. Referring to b in FIG. 10, the homepage interface includes: the cover for videos that the first user has recommended. In b in FIG. 10, short video 1, short video 2, etc. are used to characterize the cover for videos.

In one embodiment, the cover for videos recommended by the first user may belong to the "recommended" category 102 on the homepage interface. The user clicks on the recommended category 102 on the homepage interface, so that the first client can display the cover for videos that the first user has recommended. In one embodiment, the homepage interface may further include: a "works" category 103, a collection category 104, and the like. The user clicks on the "works" category 103 on the homepage interface, so that the first client can display the cover for works (e.g. videos) published by the first user.

Fifth, on the interface of the first client for playing the video (such as short video 1) recommended by the second user, a message control may also be included, and the first user can operate the message control to view videos that he/she has recommended and other information about the recommended videos.

Figure 11:
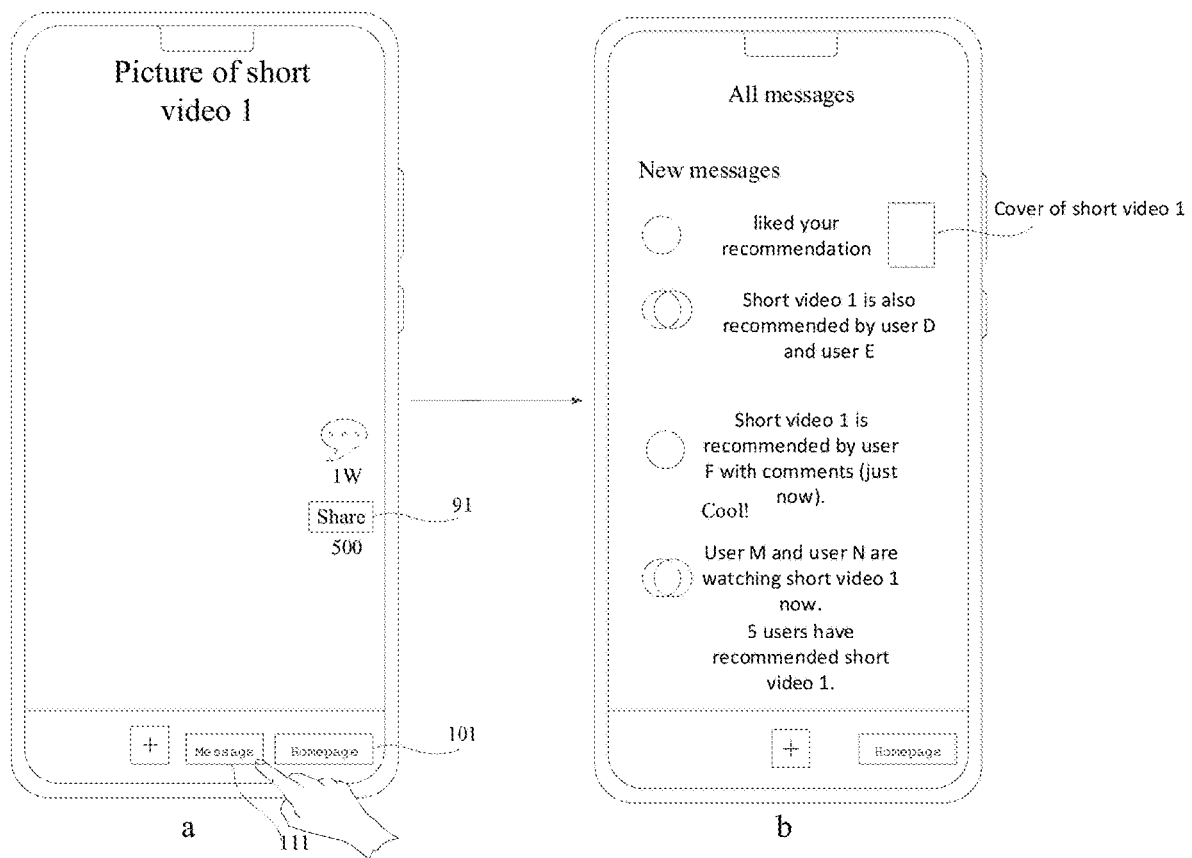
FIG. 11 is another interface schematic diagram of a client to which an embodiment of the disclosure is applicable.

Referring to FIG. 11, a in FIG. 10 may be replaced with a in FIG. 11, and the video interface of the short video 1 may further include: a message control 111. The user operates the message control 111, and the first client can display a message interface, which is a message interface of a video playback application (e.g., a short video application) of the first client.

Referring to b in FIG. 11, the message interface includes: the total number of users who have recommended videos, recommendation information of the second user to recommend the video, and information of the users currently watching the video (such as the number, users' avatars and names). The recommendation information of the second user to recommend the video may include, but not limited to, the moment when each second user recommended the video, and recommendation comment information. Illustratively, for example, the message interface may include: the number of users who have recommended short video 1 is 5, the number of users who are watching short video 1 is 2, and each piece of information of recommending short video 1 to the first user may include: the moment when each second user recommended the short video 1 to the first user, and the recommendation comment information by each second user on the short video 1.

Wherein, the first user clicks the option box 112 of "Number of users who have recommended videos", and the first client can be triggered to display a comment panel (the first comment panel or the second comment panel). The first client displays the first comment panel or the second comment panel, depending on whether the first user has recommended the short video 1 to a third user.

In the embodiment of the present disclosure, the first user can perform various operations on the video recommended by the second user, which enriches video recommendation, and achieves the purpose that multiple people can comment on a video at the same time, which can improve the user experience of recommending videos.

The embodiments above describe the processes that users can recommend videos, and comment, communicate, and recommend videos together. The following describes the process that the first user sets the function that the first client can recommend videos and receive recommended videos from the server, sets users of the first use to share with and sets which users can see the videos shared by the first user on the first user's homepage in a setting interface of short video application.

Figure 12:
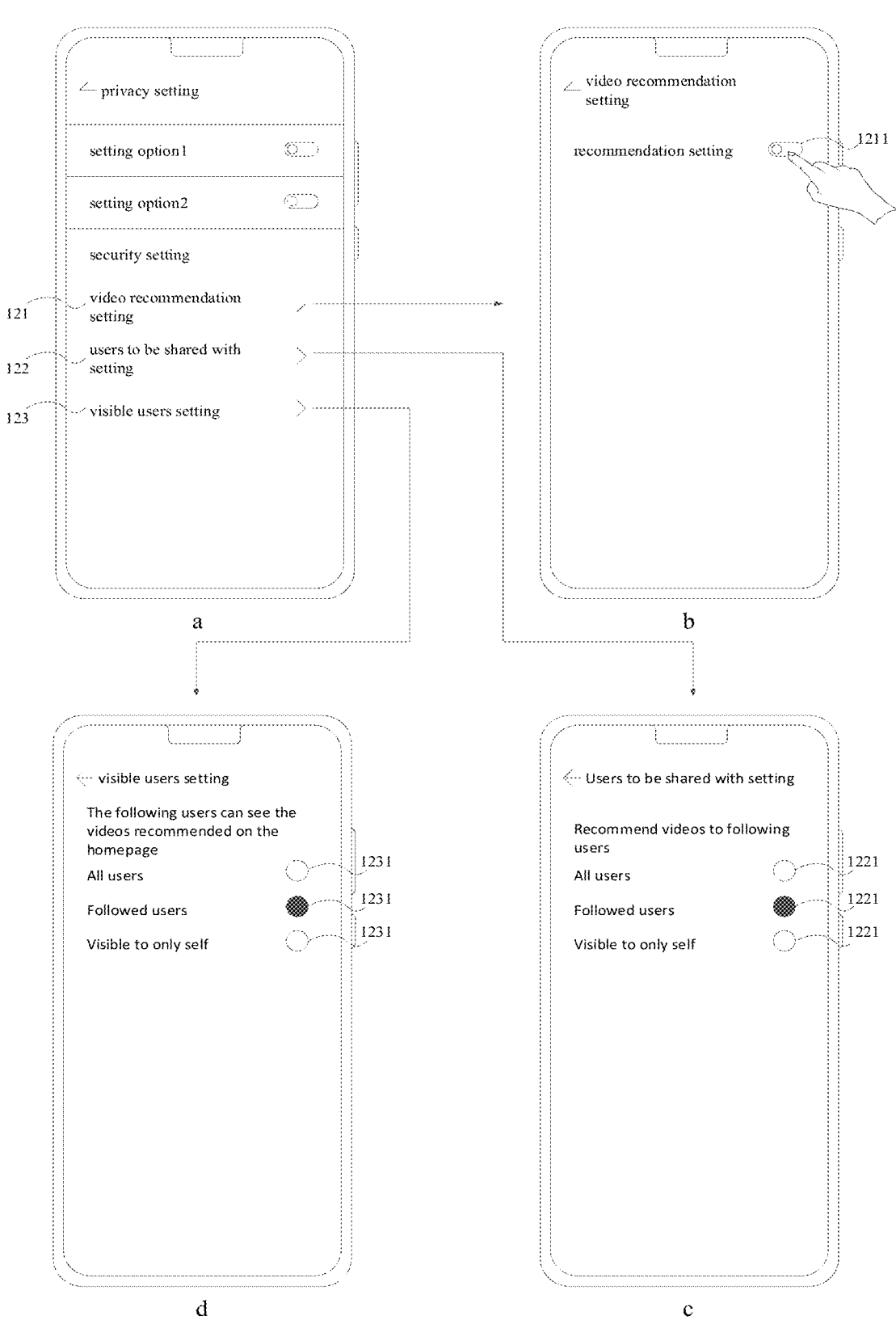
FIG. 12 is another interface schematic diagram of a client to which an embodiment of the present disclosure is applicable.

In one embodiment, referring to a in FIG. 12, the setting interface of the short video application may include: a recommendation setting option 121, an option for setting users to be shared with 122, and an option for setting visible users of the video recommended by the first user 123. In one embodiment, the option for setting users to be shared with 122 may be referred to as an option for setting recommendation visible users, and the recommendation visible users may be understood as to which users the first user recommends the video.

Wherein, the first client may display a first setting interface in response to the first user operating the recommendation setting option 121, and the first setting interface may include a recommendation setting control 1211, as shown in b in FIG. 12. The operation of the first user to open the recommendation setting control 121 can enable the first client to receive first video information from the server, and to send second video information (recommendation indication) to the server, so as to realize the method for processing video recommendations in the embodiment of the present disclosure.

Wherein, the user operates the option 122, and the first client may display a second setting interface, and the second setting interface may include a control for setting users to be shared with 1221, as shown in c in FIG. 12. The first user can select users to be shared with (i.e., third users) as: all users, followed friends, or visible only to himself/herself. In one embodiment, the first user can also choose to be visible to some users of friends he/she follows, which will not be described in detail in the embodiment of the present disclosure.

It should be understood that users to be shared with set here by the first user are third users. The second user may also set users to be shared with (i.e., first users) of the second user on a second client according to this process. In the embodiment of the present disclosure, taking any one of the first users as an example to describe the method for processing of video sharing.

Wherein, the user operates the option 123, and the first client can display a third setting interface, and the third setting interface can include a control for setting visible users of the video recommended by the first user 1231, as shown in d in FIG. 12. Users, that can be selected by the first user, who can see the videos that the first user has recommended on the homepage of the first user, are: followed users, or visible only to himself/herself. In one embodiment, the first user may also select all users, or to be visible to some users of friends he/she follows, which will not be described in detail in the embodiment of the present disclosure.

In summary, the user can set to which users to recommend videos, and which users can see the videos recommended by the first user on the homepage of the first user in a setting interface of the short video application, and the user can choose by himself/herself, which can improve the user's privacy and security.

It should be noted that the interfaces shown in the embodiments of the present disclosure are all illustrative, and based on the method for processing of video recommendations provided by the embodiments of the present disclosure, changing the form of the interfaces belongs to the scope claimed by the embodiments of the present disclosure.

Figure 13:
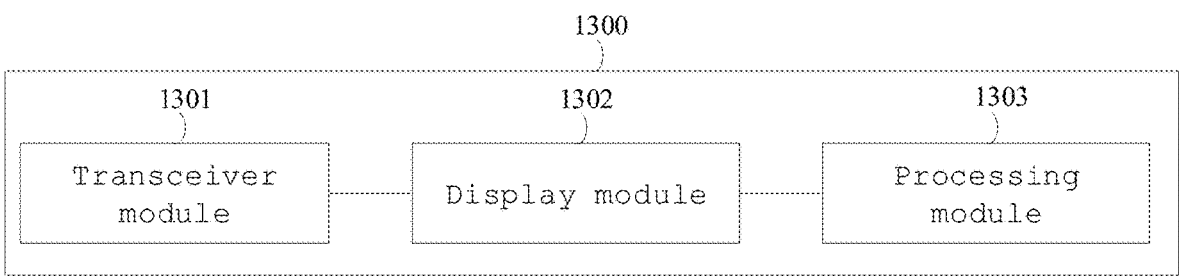
FIG. 13 is a structural block diagram of an apparatus for processing of video recommendations provided by an embodiment of the present disclosure.

Referring to FIG. 13, FIG. 13 is a structural block diagram of an apparatus for processing of video recommendations provided by an embodiment of the present disclosure, and the apparatus for processing of video recommendations may be the first client in the above embodiment. For convenience of description, only parts related to the embodiments of the present disclosure are shown, and the apparatus for processing of video recommendations may be the client in the embodiment above or a chip in the client. Referring to FIG. 13, the apparatus for processing of video recommendations 1300 includes: a transceiver module 1301, a display module 1302, and a processing module 1303. Wherein, The transceiver module 1301 is used to receive first video information, the first video information including: information of at least one of second users that recommended a video, and recommendation comment information by each second user for the video.

The display module 1302 is used to display at least part of the first video information on a playback interface for the video, and display a first comment panel in response to an interactive operation of a first user on a display area for the first video information, the first comment panel including: a recommend control.

The processing module 1303 is used to add recommendation information by the first user to the first video information to obtain second video information in response to an operation of the first user on the recommend control, the recommendation information including: first user information, and/or recommendation comment information on the video by the first user.

The transceiver module 1301 is further used to recommend the video to a third user associated with the first user, the video including the second video information.

In one possible implementation, a first user is associated with each second user.

In one possible implementation, the display module 1302 is further used to display a comment input interface, the comment input interface including: a comment publishing area.

The processing module 1303 is specifically used to add recommendation comment information on the video by the first user and the first user information into the first video information in response to the recommendation comment information on the video input by the first user in the comment publishing area.

In one possible implementation, the transceiver module 1301 is further used to send recommendation information by the first user to the at least one of the second users.

In one possible implementation, the display module 1302 is further used to display a second comment panel. The second comment panel displays recommendation comment information on the video by all recommending users. The recommending users include the first user and the at least one of the second users.

In one possible implementation, the second comment panel further includes: an identifier of each recommending user, recommendation comment information by each recommending user, and a duration from the moment when each recommending user recommended the video to the current moment.

In one possible implementation, the processing module 1303 is further used to delete the recommendation comment information by the first user in the second comment panel in response to an delete operation of the first user on the recommendation comment information by the first user.

In one possible implementation, the display module 1302 is further used to display a recommendation area on a playback interface for the video, and display an avatar of each second user in the recommendation area, and scroll to display the recommendation comment information by each second user.

In one possible implementation, the display module 1302 is specifically used to sequentially display an avatar of each second user in descending order of the degree of relevance between the first user and each second user, and sequentially scroll to display recommendation comment information by each second user.

In one possible implementation, the playback interface for the video further includes a video forwarding control. The display module 1302 is further used to display a forwarding interface in response to an operation on the video forwarding control by the first user, the forwarding interface including: a recommend control.

The processing module 1303 is further used to, in response to an operation on a recommend control on the forwarding interface by the first user to recommend the video, modify the state of the recommend control to a recommended state, the recommended state characterizing that the first user has recommended the video.

In one possible implementation, the processing module 1303 is further used to, in response to an operation of canceling recommending the video by the first user, modify the state of the recommended control to a non-recommended state, the non-recommended state characterizing that the first user has not recommended the video.

In one possible implementation, a homepage is also displayed on a playback interface for the video. The display module 1302 is further used to control to display a homepage interface in response to an operation on a homepage control by the first user, the homepage interface including: a cover for videos recommended by the first user.

In one possible implementation, a setting interface of a video playback application includes: a recommendation setting control. The processing module 1303 is further used to detect that the recommendation setting control of the first user is in an open state, enabling the first user to receive the first video information.

In one possible implementation, the setting interface further includes: a control for setting recommendation visible users, and a control for setting visible users of videos recommended by the first user, and the third user is a recommendation visible user set by the first user.

In one possible implementation, the message interface of the video playback application includes: the total number of users who have recommended the video, and recommendation information of a video recommended by the second user.

The apparatus for processing of video recommendations provided by the embodiments of the present disclosure can be used to perform technical solutions of above method embodiments, and implementation principles and technical effects thereof are similar, which will not be repeated in detail herein again in this embodiment.

In order to implement the above embodiments, an embodiment of the present disclosure further provides a terminal that bears a client.

Figure 14:
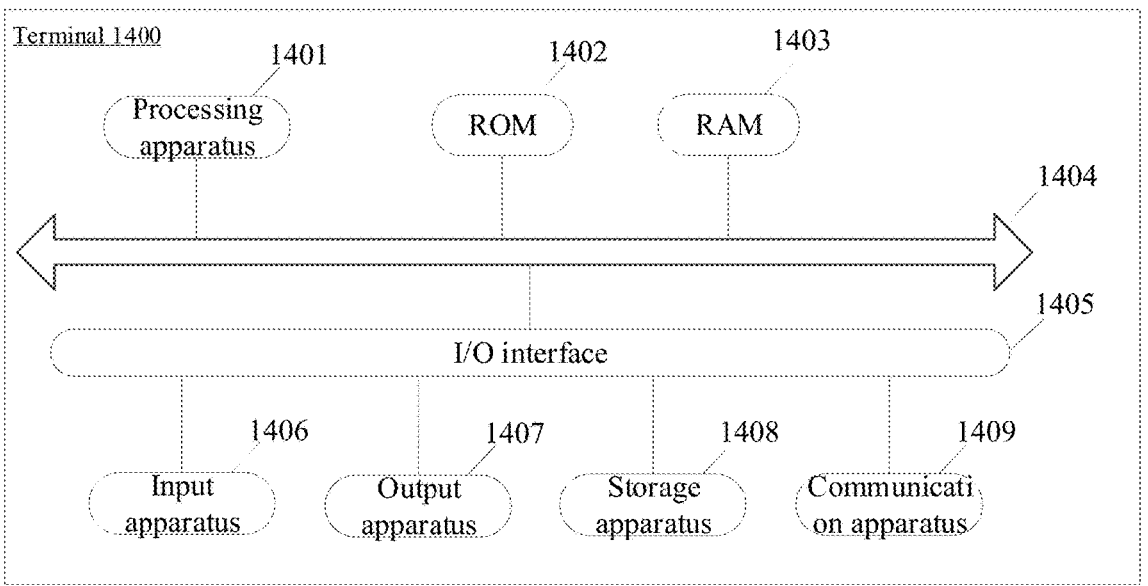
FIG. 14 is a schematic structural diagram of a terminal provided by an embodiment of the present disclosure.

Referring to FIG. 14, it shows a schematic structural diagram of a terminal suitable for an embodiment of the present disclosure. The client in above embodiment can be provided in a terminal. The terminal shown in FIG. 14 is only one example, and should not impose any limitations on functions and scope of usage of the embodiments of the present disclosure.

As shown in FIG. 14, the terminal 1400 may include a processing apparatus (e.g., a central processing unit, a graphics processor, etc.) 1401, which can execute various appropriate actions and processes according to a program stored in a Read-Only Memory (ROM) 1402 or a program loaded from a storage apparatus 1408 into a Random Access Memory (RAM) 1403. In the RAM 1403, various programs and data necessary for operations of the terminal 1400 are also stored. The processing apparatus 1401, the ROM 1402, and the RAM 1403 are connected to each other through a bus 1404. An input/output (I/O) interface 1405 is also connected to the bus 1404.

Generally, below apparatus can be connected to the I/O interface 1405: an input apparatus 1406 including, for example, a touch screen, a touch pad, a keyboard, a mouse, a camera, a microphone, an accelerometer, a gyroscope, etc.; an output apparatus 1407 including, for example, a Liquid Crystal Display (LCD), a speaker, a vibrator, etc.; a storage apparatus 1408 including, for example, a magnetic tape, a hard disk, etc.; and a communication apparatus 1409. The communication apparatus 1409 may allow the terminal 1400 to communicate wirelessly or by wire with other devices to exchange data. While FIG. 14 shows a terminal 1400 with various apparatus, it should be understood that not all of the illustrated devices are required to be implemented or provided. Alternatively, more or fewer apparatus may be implemented or provided.

In particular, according to embodiments of the present disclosure, the processes described above with reference to the flowcharts may be implemented as a computer software program. For example, embodiments of the present disclosure include a computer program product comprising a computer program carried on a computer-readable medium, the computer program containing program code for performing the method illustrated in the flowchart. In such an embodiment, the computer program may be downloaded and installed from the network via the communication apparatus 1409, or installed from the storage apparatus 1408, or from the ROM 1402. When the computer program is executed by the processing apparatus 1401, above functions defined in the methods of the embodiments of the present disclosure are executed.

It should be noted that the computer-readable medium above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. More specific examples of computer readable storage medium may include, but are not limited to, an electrical connection with one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof. In the present disclosure, a computer-readable storage medium may be any tangible medium that contains or stores a program that can be used by or in conjunction with an instruction execution system, apparatus, or device. While in the present disclosure, a computer-readable signal medium may include data signals propagated in baseband or as part of a carrier wave with computer-readable program code carried thereon. Such propagated data signals may take a variety of forms, including but not limited to electromagnetic signals, optical signals, or any suitable combination thereof. A computer-readable signal medium can also be any computer-readable medium other than a computer-readable storage medium that can transmit, propagate, or transport a program for use by or in connection with an instruction execution system, apparatus, or device. Program code embodied on a computer readable medium may be transmitted using any suitable medium including, but not limited to, electrical wire, optical fiber cable, RF (radio frequency), etc., or any suitable combination thereof.

The above computer-readable medium may be included in the above terminal; or may exist alone without being assembled into the terminal.

The above computer-readable medium carries one or more programs, which, when executed by the terminal, cause the terminal (or a client in the terminal) to execute the methods shown in above embodiments.

Computer program code for carrying out operations of the present disclosure may be written in one or more programming languages, including object-oriented programming languages—such as Java, Smalltalk, C++, but also conventional procedural programming languages—such as the "C" language or similar programming language. The program code may execute entirely on a user's computer, partly on a user's computer, as a stand-alone software package, partly on a user's computer and partly on a remote computer, or entirely on a remote computer or server. In case of a remote computer, the remote computer can be connected to the user's computer through any kind of network, including a Local Area Network (LAN) or Wide Area Network (WAN), or it can be connected to an external computer (such as via the internet using an internet service provider).

The flowcharts and block diagrams in the drawings illustrate the architecture, functionality, and operation of possible implementations of systems, methods and computer program products according to various embodiments of the present disclosure. In this regard, each block in the flowcharts or block diagrams may represent a module, a segment, or a portion of code that contains one or more executable instructions for implementing specified logical functions. It should also be noted that, in some alternative implementations, functions labeled in the blocks may occur in different order as labeled in the drawings. For example, two blocks shown in succession may, in fact, be executed substantially concurrently, or these blocks may sometimes be executed in the reverse order, depending upon the functionality involved. It is also noted that each block in block diagrams and/or flowcharts, and combinations of blocks in block diagrams and/or flowcharts, can be implemented with a dedicated hardware-based system that performs specified functions or operations, or can be implemented with a combination of dedicated hardware and computer instructions.

The modules involved in the embodiments of the present disclosure may be implemented in software or hardware. Wherein, the name of a module does not constitute a limitation on the module itself under certain circumstances, for example, a first acquisition module may also be described as "a module for acquiring at least two Internet Protocol addresses".

The functions described herein above can be performed, at least in part, by one or more hardware logic components. For example, without limitation, exemplary types of hardware logic components that can be used include: a Field Programmable Gate Array (FPGA), an Application Specific Integrated Circuit (ASIC), an Application Specific Standard Product (ASSP), a Systems on Chip (SOC), a Complex Programmable Logical Devices (CPLD), etc.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. Machine-readable medium may include, but are not limited to, an electronic, magnetic, optical, electromagnetic, infrared, or semiconductor system, device, or device, or any suitable combination thereof. More specific examples of machine-readable storage medium may include one or more wire-based electrical connections, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof.

In a first aspect, according to one or more embodiments of the present disclosure, there is provided a method for processing of video recommendations, comprising: receiving first video information, the first video information including: information of at least one of second users that recommended a video, and recommendation comment information by each second user for the video; displaying at least part of the first video information on a playback interface for the video; displaying a first comment panel in response to an interactive operation of a first user on a display area for the first video information, the first comment panel including: a recommend control; in response to an operation of the first user on the recommend control, adding recommendation information by the first user to the first video information to obtain second video information, the recommendation information including: at least one of first user information or recommendation comment information on the video by the first user; and recommending the video to a third user associated with the first user, the video including the second video information.

According to one or more embodiments of the present disclosure, the first user is associated with each second user.

According to one or more embodiments of the present disclosure, the adding recommendation information by the first user to the first video information includes: displaying a comment input interface, the comment input interface including: a comment publishing area; adding recommendation comment information on the video by the first user and the first user information into the first video information in response to the recommendation comment information on the video input by the first user in the comment publishing area.

According to one or more embodiments of the present disclosure, following the responding to an operation of the first user on the recommend control, the method further comprises: sending recommendation information by the first user to the at least one of the second users.

According to one or more embodiments of the present disclosure, the method further comprises: displaying a second comment panel. The second comment panel displays recommendation comment information on the video by all recommending users. The recommending users include the first user and the at least one of the second users.

According to one or more embodiments of the present disclosure, the second comment panel further includes: an identifier of each recommending user, recommendation comment information by each recommending user, and a duration from the moment when each recommending user recommended the video to the current moment.

According to one or more embodiments of the present disclosure, the method further comprises: deleting the recommendation comment information by the first user in the second comment panel in response to an delete operation of the first user on the recommendation comment information by the first user.

According to one or more embodiments of the present disclosure, the displaying at least part of the first video information on a playback interface for the video includes: displaying a recommendation area on a playback interface for the video; displaying an avatar of each second user in the recommendation area, and scrolling to display the recommendation comment information by each second user.

According to one or more embodiments of the present disclosure, the displaying an avatar of each second user and scrolling to display the recommendation comment information by each second user includes: sequentially displaying an avatar of each second user in descending order of the degree of relevance between the first user and each second user, and sequentially scrolling to display recommendation comment information by each second user.

According to one or more embodiments of the present disclosure, the playback interface for the video further includes a video forwarding control, and following the recommending the video to a second user associated with the first user, further includes: displaying a forwarding interface in response to an operation on the video forwarding control by the first user, the forwarding interface including: a recommend control; in response to an operation on a recommend control on the forwarding interface by the first user to recommend the video, modifying the state of the recommend control to a recommended state, the recommended state characterizing that the first user has recommended the video.

According to one or more embodiments of the present disclosure, the method further comprises: in response to an operation of canceling recommending the video by the first user, modifying the state of the recommended control to a non-recommended state, the non-recommended state characterizing that the first user has not recommended the video.

According to one or more embodiments of the present disclosure, a homepage control is also displayed on a playback interface for the video; the method further comprises: displaying a homepage interface in response to an operation on a homepage control by the first user, the homepage interface including: a cover for videos recommended by the first user.

According to one or more embodiments of the present disclosure, a setting interface of a video playback application includes: a recommendation setting control; before the receiving first video information, the method further comprises: detecting that the recommendation setting control of the first user is in an open state, enabling the first user to receive the first video information.

According to one or more embodiments of the present disclosure, the setting interface further includes: a control for setting recommended visible users, and a control for setting visible users of videos that the first user has recommended, the third user being a recommended visible user set by the first user.

According to one or more embodiments of the present disclosure, the message interface of the video playback application includes: the total number of users who have recommended the video, and recommendation information of the video recommended by the second user.

In a second aspect, according to one or more embodiments of the present disclosure, there is provided an apparatus for processing of video recommendations, comprising:

a transceiver module used to receive first video information, the first video information including: information of at least one of second users that recommended a video, and recommendation comment information by each second user for the video;

a display module used to display at least part of the first video information on a playback interface for the video, and display a first comment panel in response to an interactive operation of a first user on a display area for the first video information, the first comment panel including: a recommend control;

a processing module used to add recommendation information by the first user to the first video information to obtain second video information in response to an operation of the first user on the recommend control, the recommendation information including: at least one of first user information or recommendation comment information on the video by the first user.

The transceiver module is further used to recommend the video to a third user associated with the first user, the video including the second video information.

According to one or more embodiments of the present disclosure, the first user is associated with each second user.

According to one or more embodiments of the present disclosure, the display module is further used to display a comment input interface, the comment input interface including: a comment publishing area.

The processing module is specifically used to add recommendation comment information on the video by the first user and the first user information into the first video information in response to the recommendation comment information on the video input by the first user in the comment publishing area.

According to one or more embodiments of the present disclosure, the transceiver module is further used to send recommendation information by the first user to the at least one of the second users.

According to one or more embodiments of the present disclosure, the display module is further used to display a second comment panel. The second comment panel displays recommendation comment information on the video by all recommending users. The recommending users include the first user and the at least one of the second users.

According to one or more embodiments of the present disclosure, the second comment panel further includes: an identifier of each recommending user, recommendation comment information by each recommending user, and a duration from the moment when each recommending user recommended the video to the current moment.

According to one or more embodiments of the present disclosure, the processing module is further used to delete the recommendation comment information by the first user in the second comment panel in response to an delete operation of the first user on the recommendation comment information by the first user.

According to one or more embodiments of the present disclosure, the display module is further used to display a recommendation area on a playback interface for the video, and display an avatar of each second user in the recommendation area, and scroll to display the recommendation comment information by each second user.

According to one or more embodiments of the present disclosure, the display module is specifically used to sequentially display an avatar of each second user in descending order of the degree of relevance between the first user and each second user, and sequentially scroll to display recommendation comment information by each second user.

According to one or more embodiments of the present disclosure, the playback interface for the video further includes a video forwarding control. The display module is further used to display a forwarding interface in response to an operation on the video forwarding control by the first user, the forwarding interface including: a recommend control.

The processing module is further used to, in response to an operation on a recommend control on the forwarding interface by the first user to recommend the video, modify the state of the recommend control to a recommended state, the recommended state characterizing that the first user has recommended the video.

According to one or more embodiments of the present disclosure, the processing module is further used to, in response to an operation of canceling recommending the video by the first user, modify the state of the recommended control to a non-recommended state, the non-recommended state characterizing that the first user has not recommended the video.

According to one or more embodiments of the present disclosure, a homepage is also displayed on a playback interface for the video. The display module is further used to display a homepage interface in response to an operation on a homepage control by the first user, the homepage interface including: a cover for videos recommended by the first user.

According to one or more embodiments of the present disclosure, a setting interface of a video playback application includes: a recommendation setting control. The processing module is further used to detect that the recommendation setting control of the first user is in an open state, enabling the first user to receive the first video information.

According to one or more embodiments of the present disclosure, the setting interface further includes: a control for setting recommended visible users, and a control for setting visible users of videos that the first user has recommended, the third user being a recommended visible user set by the first user.

According to one or more embodiments of the present disclosure, the message interface of the video playback application includes: the total number of users who have recommended the video, and recommendation information of a video recommended by the second user.

In a third aspect, according to one or more embodiments of the present disclosure, there is provided a client, comprising: a processor and a memory; the memory stores computer-executed instructions; the processor executes the computer-executed instructions stored in the memory, causing the processor to execute the method for processing of video recommendations as described above in the first aspect and various possible designs of the first aspect.

In a fourth aspect, according to one or more embodiments of the present disclosure, there is provided a non-transitory computer-readable storage medium having computer-executed instructions stored therein, which, when executed by a processor, implement the method for processing of video recommendations as described above in the first aspect and various possible designs of the first aspect.

In a fifth aspect, according to one or more embodiments of the present disclosure, there is provided a computer program product including computer instructions, which, when executed by a processor, implement the method for processing of video recommendations as described above in the first aspect and various possible designs of the first aspect.

The above description is merely preferred embodiments of the present disclosure and an illustration of the technical principles employed. Those skilled in the art should understand that the scope of the disclosure involved in the present disclosure is not limited to technical solutions formed by specific combination of above technical features, and should also cover technical solutions formed by other technical solutions formed by any combination of above technical features or its equivalent features without departing from above disclosed concept. For example, technical solutions that are formed by replacing above features with technical features disclosed in the present disclosure (but not limited to) with similar functions.

Additionally, although operations are depicted in a particular order, this should not be construed as requiring that the operations be performed in the particular order shown or in a sequential order. Under certain circumstances, multitasking and parallel processing may be advantageous. Likewise, although the above discussion contains several implementation-specific details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or logical acts of method, it is to be understood that the subject matter defined in the appended claims is not necessarily limited to the specific features or acts described above. Rather, the specific features and acts described above are merely example forms to implement the claims.

What is claimed is:

1. A method comprising:

receiving video content and first video information, the first video information comprising information associated with at least one second user that recommends a video, the first video information comprising, for each second user: user information of the second user, and comment information provided by the second user for the video content, wherein each second user is associated with a first user;

displaying a control related to the first video information on a video playback interface of the video, wherein in response to the first user has not recommended the video, a recommendation state of the control is in a non-recommended state;

in response to the recommendation state of the control is in the non-recommended state, and in response to an operation of the first user on the control, obtaining second video information, the second video information comprising: user information of the first user, comment information provided by the first user for the video, and comment information by the first user on the comment information by the at least one second user; and distributing the video to at least one third user associated with the first user, wherein the video comprising the video content, the first video information and the second video information, wherein the method further comprises: in response to the operation of the first user on the control, modifying the recommendation state of the control to a recommended state, wherein the recommended state indicates the first user has recommended the video.

2. The method of claim 1, wherein the second video information is added to the first video information.

3. The method of claim 1, wherein obtaining the second video information comprises:

displaying a comment input interface; and receiving input from the first user to the comment input interface.

4. The method of claim 1, wherein the displaying a control related to the first video information on a video playback interface of the video comprises:

displaying the control in response to an interactive operation of the first user on a region of the video playback interface presenting the video content, or displaying the control in response to an interactive operation of the first user on a share control displayed within the region of the video playback interface presenting the video content.

5. The method of claim 4, wherein in response to the interactive operation, a sharing interface is presented, the sharing interface including at least the control.

6. The method of claim 1, further comprising:

after receiving the video content and the first video information, presenting the video within a region of the video playback interface, wherein presenting the video further comprises:

displaying the first video information for each of the at least one second user within the region of the video playback interface presenting the video content.

7. The method of claim 6, wherein displaying the first video information comprises displaying an identifier of each second user and corresponding comment information provided by the second user.

8. The method of claim 7, wherein the displaying an identifier of each second user comprises presenting an image associated with the corresponding second user.

9. The method of claim 1, wherein in response to providing the video to one of the at least one third user comprises:

presenting the video within a region of a video playback interface associated with the at least one third user, wherein presenting the video further comprises:

displaying the first video information for each of the at least one second user and the second video information of the first user within the region of the video playback interface presenting the video content.

10. An electronic device, comprising:

at least one processor and a memory;

wherein the memory stores computer-executed instructions; and the at least one processor executes the computer-executed instructions stored in the memory to perform operations comprising:

receiving video content and first video information, the first video information comprising information associated with at least one second user that recommends a video, the first video information comprising, for each second user: user information of the second user, and comment information provided by the second user for the video content, wherein each second user is associated with a first user;

displaying a control related to the first video information on a video playback interface of the video, wherein in response to the first user has not recommended the video, a recommendation state of the control is in a non-recommended state;

in response to the recommendation state of the control is in the non-recommended state, and in response to an operation of the first user on the control, obtaining second video information, the second video information comprising: user information of the first user, comment information provided by the first user for the video, and comment information by the first user on the comment information by the at least one second user; and distributing the video to at least one third user associated with the first user, wherein the video comprising the video content, the first video information and the second video information, wherein the operations further comprise: in response to the operation of the first user on the control, modifying the recommendation state of the control to a recommended state, wherein the recommended state indicates the first user has recommended the video.

11. The electronic device of claim 10, wherein the second video information is added to the first video information.

12. The electronic device of claim 10, wherein obtaining the second video information comprises:

displaying a comment input interface; and receiving input from the first user to the comment input interface.

13. The electronic device of claim 10, wherein the displaying a control related to the first video information on a video playback interface of the video comprises:

displaying the control in response to an interactive operation of the first user on a region of the video playback interface presenting the video content, or displaying the control in response to an interactive operation of the first user on a share control displayed within the region of the video playback interface presenting the video content.

14. The electronic device of claim 13, wherein in response to the interactive operation, a sharing interface is presented, the sharing interface including at least the control.

15. The electronic device of claim 10, wherein the operations comprise:

after receiving the video content and the first video information, presenting the video within a region of the video playback interface, wherein presenting the video further comprises:

displaying the first video information for each of the at least one second user within the region of the video playback interface presenting the video content.

16. The electronic device of claim 15, wherein displaying the first video information comprises displaying an identifier of each second user and corresponding comment information provided by the second user.

17. The electronic device of claim 16, wherein the displaying an identifier of each second user comprises presenting an image associated with the corresponding second user.

18. The electronic device of claim 10, wherein in response to providing the video to one of the at least one third user comprises:

presenting the video within a region of a video playback interface associated with the at least one third user, wherein presenting the video further comprises:

displaying the first video information for each of the at least one second user and the second video information of the first user within the region of the video playback interface presenting the video content.

19. One or more non-transitory computer-readable storage media, the computer-readable storage media having computer-executed instructions stored therein, which, when executed by at least one processor, causes the at least one processor to perform operations comprising:

receiving video content and first video information, the first video information comprising information associated with at least one second user that recommends a video, the first video information comprising, for each second user: user information of the second user, and comment information provided by the second user for the video content, wherein each second user is associated with a first user;

displaying a control related to the first video information on a video playback interface of the video, wherein in response to the first user has not recommended the video, a recommendation state of the control is in a non-recommended state;

in response to the recommendation state of the control is in the non-recommended state, and in response to an operation of the first user on the control, obtaining second video information, the second video information comprising: user information of the first user, comment information provided by the first user for the video, and comment information by the first user on the comment information by the at least one second user; and distributing the video to at least one third user associated with the first user, wherein the video comprising the video content, the first video information and the second video information, wherein the operations further comprise: in response to the operation of the first user on the control, modifying the recommendation state of the control to a recommended state, wherein the recommended state indicates the first user has recommended the video.

20. The one or more non-transitory computer-readable storage media of claim 19, wherein obtaining the second video information comprises:

displaying a comment input interface; and receiving input from the first user to the comment input interface.

* * * * *